US008922350B2

(12) United States Patent
Griffin et al.

(10) Patent No.: US 8,922,350 B2
(45) Date of Patent: Dec. 30, 2014

(54) TRANSMIT DIVERSITY FOR PASSIVE BACKSCATTER RFID

(75) Inventors: Joshua D. Griffin, Pittsburgh, PA (US); Azhar Hasan, Atlanta, GA (US); Chenming Zhou, Pittsburg, PA (US)

(73) Assignee: Disney Enterprises, Inc., Burbank, CA (US)

( * ) Notice: Subject to any disclaimer, the term of this patent is extended or adjusted under 35 U.S.C. 154(b) by 377 days.

(21) Appl. No.: 13/314,905

(22) Filed: Dec. 8, 2011

(65) Prior Publication Data

US 2013/0147609 A1 Jun. 13, 2013

(51) Int. Cl.
*H04Q 5/22* (2006.01)
(52) U.S. Cl.
USPC ........................................................ 340/10.5
(58) Field of Classification Search
CPC ........................ G06K 7/01; H01Q 3/26; G01S 13/00–13/788
See application file for complete search history.

(56) References Cited

U.S. PATENT DOCUMENTS

2007/0001814 A1\* 1/2007 Steinke et al. ............. 340/10.31
2009/0273449 A1\* 11/2009 Tuttle .......................... 340/10.4

FOREIGN PATENT DOCUMENTS

WO WO 2010/054689 \* 5/2010

OTHER PUBLICATIONS

Griffin, Joshua, The Fundamentals of Backscatter Radio and RFID Systems, Disney Research Pittsburgh, Jun. 2009, Disney Research, Pittsburgh, Pennsylvania, United States.

Griffin, Joshua, The Fundamentals of Backscatter Radio and RFID Systems Part II, Disney Research Pittsburgh, Jun. 2009, Disney Research, Pittsburgh, Pennsylvania, United States.
Griffin, Joshua et al., Gains for RF Tags Using Multiple Antennas, IEEE Transactions on Antennas and Propagation, Feb. 2008, pp. 563-570, vol. 56, No. 2, IEEE, Piscataway, New Jersey, United States.
Griffin, Joshua et al, Link Envelope Correlation in the Backscatter Channel, IEEE Communications Letters, Sep. 2007, pp. 735-737, vol. 11, No. 9, IEEE, Piscataway, New Jersey, United States.
Angerer, Christoph et al., Experimental Performance Evaluation of Dual Antenna Diversity Receivers for RFID Readers, Proceedings of the Third International EURASIP Workshop on RID Technology, Sep. 2010, pp. 5-10, IEEE, Piscataway, New Jersey, United States.
Angerer, Christoph et al., Maximal Ratio Combining Receivers for Dual Antenna RFID Readers, IEEE MTTS International Microwave Workshop on Wireless Sensing, Sep. 2009, pp. 1-4, IEEE, Piscataway, New Jersey, United States.

\* cited by examiner

*Primary Examiner* — Brian Zimmerman
*Assistant Examiner* — Thomas McCormack
(74) *Attorney, Agent, or Firm* — Patterson & Sheridan, LLP

(57) ABSTRACT

Techniques are presented for adaptively increasing power delivered to an RF tag. In one embodiment, a tag reader uses multiple transmit antennas to increase the power delivered to an RF tag without increasing the transmission power. The tag reader may perform transmit diversity (or a related antenna diversity schema) to ensure that transmitted signals from the multiple transmit antennas constructively interfere at the location of the RF tag. The tag reader may transmit a pilot signal and measure a phase associated with a received signal from the RF tag. The tag reader may then use the phase to determine a phase shift for each of the plurality of antennas. The phase shift may then be applied to any subsequent signals transmitted by the antennas to ensure that the signals interfere at the RF tag's location.

25 Claims, 16 Drawing Sheets

TRANSMIT DIVERSITY FOR PASSIVE BACKSCATTER RFID

BACKGROUND

1. Field of the Invention

Embodiments presented in this disclosure generally relate to adaptively increasing power delivered to an RF tag.

2. Description of the Related Art

Typical radio frequency identification (RFID) tags or RF tags include a microprocessor functionally connected to an antenna. The microprocessor stores and processes relevant data that may include unique data for identifying a specific item associated with the RF tag. The microprocessor also modulates a radio frequency (RF) signal that is transmitted or backscattered via the antenna. An external tag reader captures the data signal transmitted by the RF tag.

Conventional RF tags are either "active" (with an internal power source for transmitting a modulated signal to the tag reader), "passive" (without any internal power source), or "semi-passive" (includes an internal power source but does not use that power source to backscatter a modulated signal to the tag reader). Passive and semi-passive RF tags are powered by the incident signal transmitted by the tag reader and use that power to backscatter a modulated signal to the tag reader. Passive and semi-passive RF tags are typically less expensive than active tags but have shorter functional ranges than active RF tags.

One limit to the range of the passive and semi-passive RF tags is the power of the transmitted incident signal. At a fixed transmitted power level, the signal attenuates at a certain radius away from the antenna such that the received power at the RF tag is not enough to activate the RF tag's integrated circuit (e.g., microprocessor) that modulates the signal. This limit defines the read zone for the RF tag. Once the RF tag moves beyond the read zone, the RF tag and tag reader can no longer communicate. Moreover, the signal path between the tag reader and RF, tag may be further hindered by multipath fading from destructive interference. Even if the RF tag is within the read zone of the tag reader's antenna, multipath fading may prevent the RF tag from receiving enough power to communicate with the tag reader.

SUMMARY

One embodiment presented in this disclosure includes a method for delivering power to an RF tag. The method transmits a pilot signal from a first antenna where the first antenna selected from a plurality of antennas coupled to an RF tag reader. The method measures a first phase of a modulated signal received from the RF tag where the modulated signal is emitted by the RF tag in response to the pilot signal. The method includes determining a phase shift based on the first phase of the modulated signal and phase shifting at least one signal transmitted by at least one of the plurality of antennas based on the phase shift such that the at least one signal and a second signal transmitted from a different antenna of the plurality of the antennas interfere at a location of the RF tag.

Another embodiment includes a tag reader for delivering power to an RF tag. The tag reader includes a interface configured to couple to a plurality of antennas where a first antenna selected from the plurality of antennas is configured to transmit a pilot signal. The tag reader measures a first phase from a modulated signal received from the RF tag where the modulated signal is emitted in response to the pilot signal. Moreover, the tag reader determines a phase shift based on the first phase of the modulated signal. The tag reader also includes a phase shifting component configured to phase shift at least one signal transmitted by at least one of the plurality of antennas based on the phase shift where the at least one signal and a second signal transmitted from a different antenna of the plurality of the antennas interfere at a location of the RF tag.

Another embodiment includes a system for delivering power to an RF tag. The system includes a passive or semi-passive RF tag and a tag reader configured to communicate with the RF tag. The tag reader includes an interface configured to couple to a plurality of antennas where a first antenna selected from the plurality of antennas is configured to transmit a pilot signal and where the tag reader is configured to measure a first phase from a modulated signal received from the RF tag. In addition, the modulated signal is emitted in response to the pilot signal and the tag reader is configured to determine a phase shift based on the first phase of the modulated signal. The tag reader of the system also includes a phase shifting component that is configured to phase shift at least one signal transmitted by at least one of the plurality of antennas based on the phase shift where the at least one signal and a second signal transmitted from a different antenna of the plurality of the antennas interfere at a location of the RF tag.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
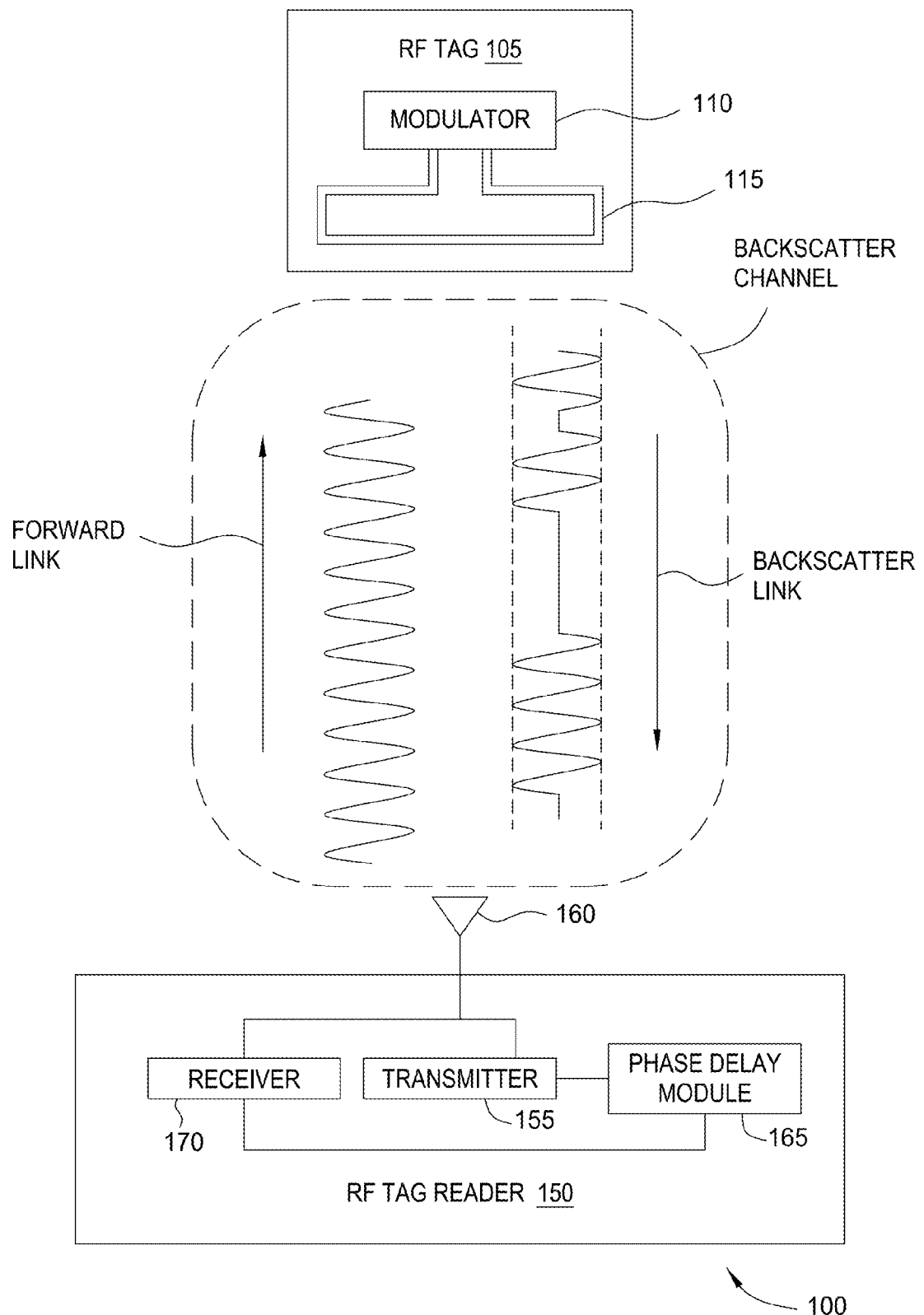
FIG. 1 is an RFID system, according to one embodiment of the invention.

Embodiments of the present invention include techniques for delivering increased power to an RF tag using a plurality of antennas coupled to a tag reader. The tag readers may operate in either monostatic mode—i.e., the antennas coupled to the reader are configured to both transmit a signal to, and receive a signal from, the RF tag—or bistatic mode—i.e., the antennas are configured to either transmit a signal to or receive a signal from the RF tag but not both. For the tag reader to receive a modulated signal from a passive or semi-passive backscattering RF tag, the power delivered by the transmitted signals must be greater than a certain threshold. This threshold depends on the circuitry of the individual RF tag. In environments that create multipath propagation—i.e., where electromagnetic waves transmitted by a single antenna reach the RF tag by two or more paths—these multipaths may either constructively or destructively interfere. Moreover, the multipath signals from one antenna may interfere with the multipath signals from another antenna. Destructive interference of multipaths (or multipath fading) limits the amount of power that may be delivered to the RF tag compared to the power that would be delivered without multipath fading. Conversely, constructive interference (or coherent addition) of multipath signals at a specified spatial location or in a specific direction may increase the power delivered to the RF tag compared to the power that would be delivered without multipath fading.

In one embodiment, the tag reader may use transmit diversity to ensure that the signals transmitted by the plurality of transmit antennas constructively interfere at the location of the RF tag. The tag reader transmits a pilot signal to the RF tag and receives a modulated signal in response. Using the phase information contained in the received signal, the RFID system may phase shift the signals transmitted by at least one of the antennas coupled to the tag reader such that the multipath signals from multiple antennas constructively interfere at the location of the RF tag. This increases the power delivered to the RF tag without increasing the transmission power of the tag reader or implementing expensive or bulky circuitry on the RF tag. One example of ensuring that signals from multiple antennas constructively interfere is disclosed in "Transmit Diversity for Backscatter RFID: Preliminary Results" by Azhar Hasan, Chenming Zhou, and Joshua D. Griffin, and which was presented at the 5$^{th}$ Annual IEEE International Conference on RFID Apr. 12-14, 2011 and is herein incorporated by reference.

In one embodiment, one of the antennas of a monostatic tag reader transmits the pilot signal until a modulated signal from an RF tag is detected. The tag reader measures the total phase ($\theta$) of the received signal, divides the phase in half ($\theta/2$) to compensate for the delay of the signal traveling from the antenna to the RF tag, and shifts any subsequent signals transmitted by the antenna by $-\theta/2$. This same process may then be repeated for each of the antennas of the monostatic tag reader. This technique ensures that the multipath signals from multiple antennas constructively interfere at the location of the RF tag. In one embodiment, the total measured phase for each antenna may be a wrapped phase (i.e., a phase limited to 0-360 degrees). In this case, the tag reader may ensure that phase shifting the transmitted signal by $-\theta/2$ causes the multipath signals to constructively interfere at the RF tag by accounting for the wrapped phase.

In one embodiment, one of the antennas of a monostatic tag reader is selected as the reference antenna. While all of the antennas of the tag reader are simultaneously broadcasting a pilot signal, only the reference antenna is receiving the modulated signal from the RF tag. The total phase ($\theta_1$) for that signal is measured. A second antenna is then selected to receive the backscattered signal. The total phase ($\theta_2$) for that signal is also measured and compared to the phase of the first signal path. The phase difference ($\theta_1-\theta_2$) is then used to phase shift any subsequent signal transmitted by the second antenna. That is, the phase of any signal transmitted by the second antenna matches the phase of the signals transmitted from the reference antenna at the RF tag. The same process may be repeated with the rest of the antennas in the monostatic tag reader. This technique matches the phase of the signals transmitted from all the antennas to the phase of the signal transmitted from the reference antenna and ensures constructive interference of the multipath signals from the multiple antennas at the location of the RF tag.

In one embodiment, the tag reader operates in a bistatic mode—i.e., each of the coupled antennas is either a transmit antenna or a receive antenna but not both. One of the transmit antennas and one of the receive antennas are selected as reference antennas. The reference transmit antenna broadcasts the pilot signal while the reference receive antenna receives the modulated signal. The phase ($\theta_1$) for the signal is then measured. A second transmit antenna then broadcasts the pilot signal while the reference receive antenna again receives the backscattered or transmitted signal. The phase for that signal ($\theta_2$) is also measured. The phase difference ($\theta_1-\theta_2$) between the two signals is then used as a phase shift for any signals subsequently transmitted by the second transmit antenna. The same process performed on the second transmit antenna may also be performed on all the transmit antennas in the tag reader. In this manner, each of the transmit antennas have the same phase relative to the reference transmit antenna. This technique ensures constructive interference of the multipath signals from multiple antennas at the location of the RF tag.

Typical RFID systems require RF tags to pass through a portal (i.e., a defined area or volume) to communicate with a tag reader. Advantageously, the embodiments disclosed herein may be used in an RFID system where a portal is not defined. That is, the present invention does not rely on the RF tag passing through a known space for ensuring that the tag is identified.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present, invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Implementing Transmit Diversity in an RFID System

FIG. 1 is an RFID system, according to one embodiment of the invention. The RFID system 100 includes an RF tag reader 150 and an RF tag 105. The tag reader 150 may either operate in monostatic or bistatic mode and includes at least one antenna 160 coupled to at least one of a receiver 170 or transmitter 155. For example, the tag reader 150 may include an interface connected (via a wire or wirelessly) to the antennas 160 which permits the tag reader 150 to communicate with the antennas 160. The transmitter 155 may also be coupled to a phase delay module 165 that may phase shift a signal transmitted by the antenna 160. In addition, the phase delay module 165 (or a separate module) may measure the phase of a signal received by the antenna 160 and receiver 170. Although shown as being part of the tag reader 150, the phase delay module 165 may consist of components either on, or located remotely of, the tag reader 150. Moreover, the functions of the phase delay module 165 may vary based on the type of tag reader 150; for example, each antenna of a monostatic tag reader 150 may be connected to both the receiver 170 and the transmitter 155 (e.g., one single transceiver component). Accordingly, the phase delay module 165 may receive phase information from antenna 160 via receiver 170, perform phase calculations, and send the resulting phase shift to the transmitter 155.

Alternatively, although not shown in FIG. 1, each antenna of a bistatic tag reader 150 may be coupled to either the transmitter 155 or receiver 170 but not both. Accordingly, the phase delay module 165 may receive the phase information for a received signal from an antenna 160 connected only to a receiver 170—i.e., a receive antenna—but phase shift a signal transmitted by a different antenna 160 connected only to a transmitter 155—i.e., a transmit antenna.

The RF tag 105 includes a modulator 110 and an antenna 115. The antenna 115 may both receive the signal transmitted by the antenna 160 of the tag reader 150 and transmit or backscatter a modulated signal back to the tag reader 150. In one embodiment, the transmitted signal of the tag reader 150 energizes the modulator 110 which then modulates and backscatters a signal (using the antenna 115) back to the tag reader 150. The modulator 110 may use any common and well-known modulation schemes such as amplitude shift keying (ASK), on-off keying (OOK), phase shift keying (PSK), and the like to encode information on a carrier signal.

In one embodiment the RF tag 105 is used in RFID. Here, the modulator 110 uses a modulation scheme to encode a carrier signal with an identification code (e.g., 127 bytes) that is associated with the tag 105. Once the tag reader 150 receives the modulated signal, it can convert down to baseband (i.e., without the carrier signal) and detect the identification code. For example, the identification code may be modulated at 1.25 MHz onto a carrier frequency of 5.82 GHz.

The RF tag 105 may be an active, passive, or semi-passive RF tag. An active RF tag 105 uses its own power source to receive a signal from the tag reader 150 and transmit a modulated signal back to the tag reader 150. That is, an active tag 105 does not use backscattering to transmit a signal to the tag reader 150. A semi-passive RF tag 105 may have its'own power source but it does not use this source to broadcast the modulated, backscattered signal to the tag reader 150. A passive RF tag 105 lacks any kind of internal power source. The RFID system 100 is not limited to only one type of RF tag 105 but may use a combination of RF tags simultaneously. For all the embodiments discussed herein, any type of RF tag may be used unless stated otherwise. Alternatively, the RFID system 100 may exclude certain RF tags and use, for example, only passive or semi-passive backscattering RF tags 105 to communicate with the tag reader 150. In one embodiment, the present embodiments may be implemented on a one or more backscatter RF tags, surface acoustic wave (SAW) RF tags, and the like. As used herein, "transmitting" a modulate signal from the RF tag to the tag reader implies using an active RF tag while "backscattering" or "scattering" implies using a passive or semi-passive RF tag to modulate the received signal.

The forward link of the backscatter channel is illustrated by the arrow pointing towards the RF tag 105. The forward link is the path followed by the transmitted signal from the antenna 160 that is received by the RF tag 105. In an environment that includes multipaths, the forward link would include all the different paths used by the multipaths emitting from a single antenna 160. As shown, the tag reader 150 may transmit an unmodulated pilot signal to the RF tag 105. As used herein, the pilot signal refers to a signal transmitted by the tag reader 150 before a phase shift has been applied or to a signal transmitted by the tag reader 150 to initiate communication with the RF tag 105. The pilot signal may be the same frequency as the carrier frequency used by the RF tag 105—e.g., 5.8 GHz—but is not limited to such. Although not shown, the pilot signal may also be modulated by the tag reader 150 to encode data or instructions intended for the RF tag 105.

The backscatter link is illustrated by the arrow pointing towards the tag reader 150. The backscatter link is the path followed by the modulated signal from the RF tag 105 to the antenna 160 of the RF tag reader 150. The signal shown in the backscatter link of FIG. 1 shows a carrier signal that may be modulated based on PSK, ASK, OOK, and the like. The encoded data may include, for example, the identification code associated with the RF tag 105. The backscatter link includes all the paths traversed by the modulated signal from the RF tag 105 to the one or more antennas 160 of the tag reader 150.

The forward and backscatter links are, in combination, referred to as the backscatter channel.

Moreover, although a narrowband (i.e., a single frequency) signal is illustrated. The embodiments discussed herein may be used for wideband signals—i.e., signals with multiple frequencies. Specifically, a phase for each of the frequencies in the signal may be determined and, based on these phases, multiple phase shifts may be generated and used to ensure subsequently transmitted signals interfere at a particular location.

Figure 2:
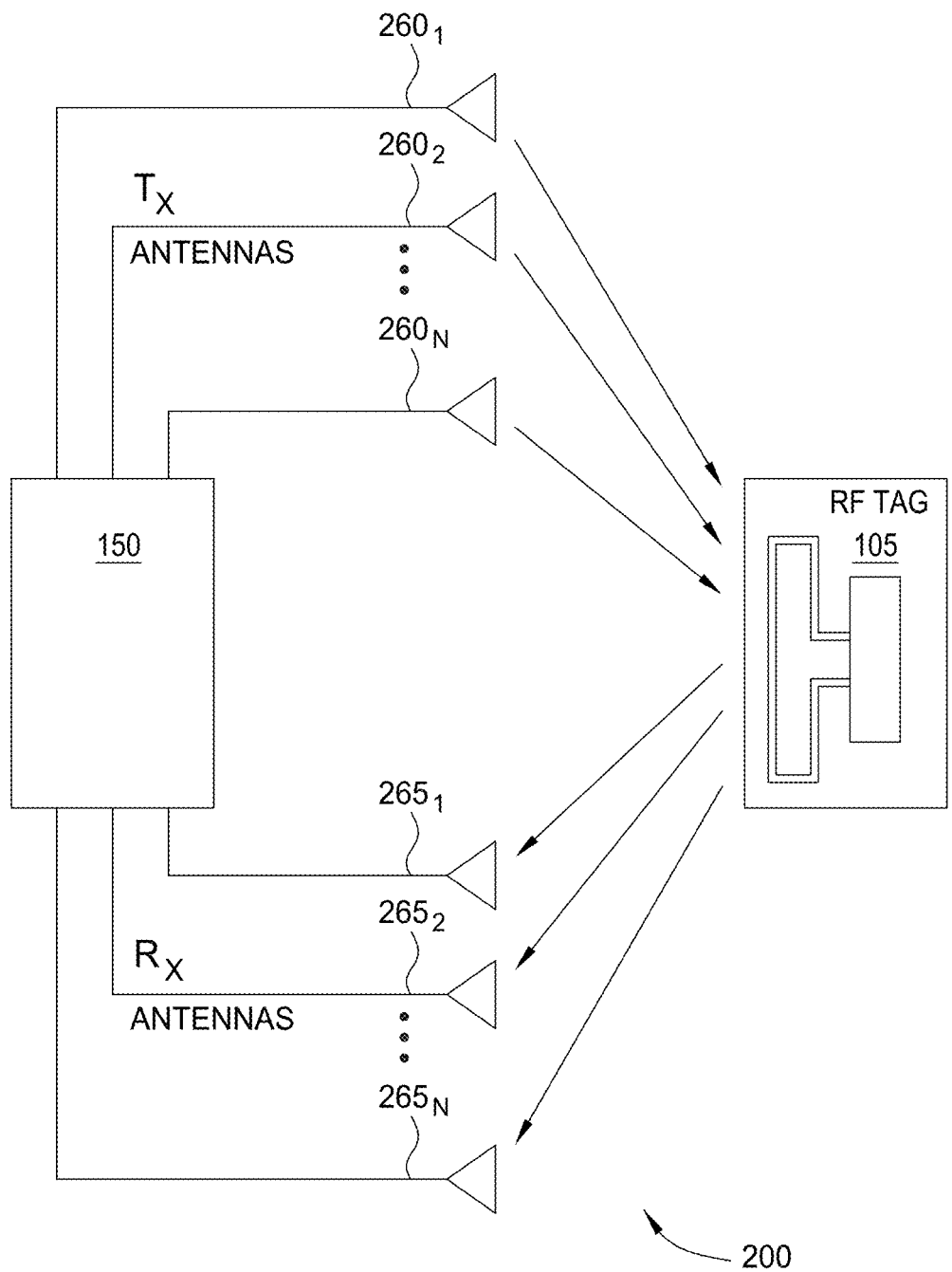
FIG. 2 is an RFID system with a bistatic tag reader, according to one embodiment of the invention.

FIG. 2 is an RFID system with a bistatic tag reader, according to one embodiment of the invention. As shown, the RFID system 200 includes a plurality of transmit antennas $260_{1-N}$ and a plurality of receive antennas $265_{1-N}$. In operation, the transmit antennas $260_{1-N}$ broadcast a signal to the RF tag 105. In case of a passive or semi-passive RF tag 105, if the received signal exceeds the necessary threshold for energizing the modulator 110, the RF tag 105 backscatters a modulated signal to the receive antennas $265_{1-N}$. Each antenna 260, 265 would be associated with either a receiver 170 or transmitter 155. In contrast, a monostatic antenna may be associated with a transceiver that permits the tag reader 150 to both transmit and receive signals using the antenna.

Using a plurality of transmit or receive antennas may increase the ability of the RFID system 200 to receive modulated signals from the RF tag 105 even if the same power is used transmit from only one antenna—i.e., the disclosed embodiments do not require adding power to the backscatter channel. For example, using transmit diversity may provide a benefit even if the same power (P) that is transmitted by an RF system with only one antenna is then used to transmit on a plurality of N antennas such that the power transmitted by each of the plurality of antennas is P/N.

Figure 3A:
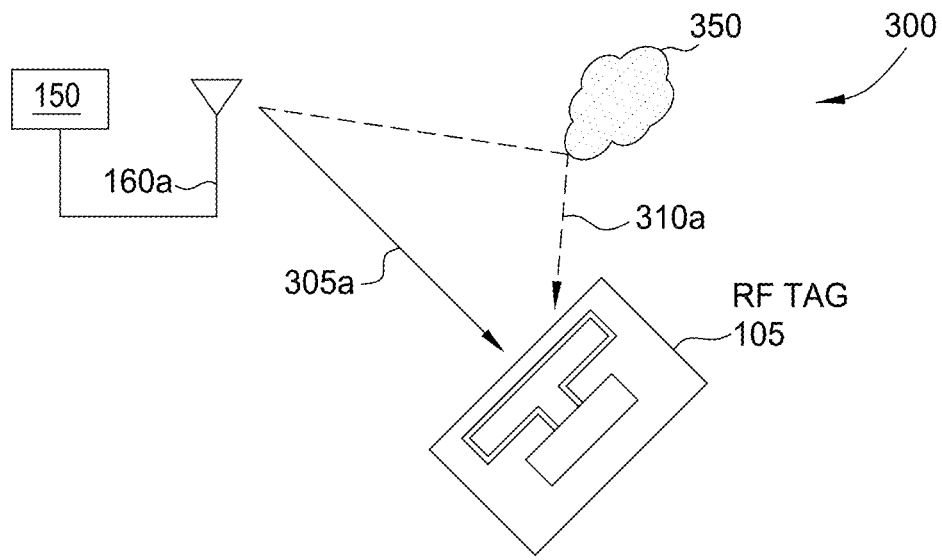
FIGS. 3A-B illustrate an RFID system experiencing multipath signal propagation from multiple antennas, according to one embodiment of the invention.
Figure 3B:
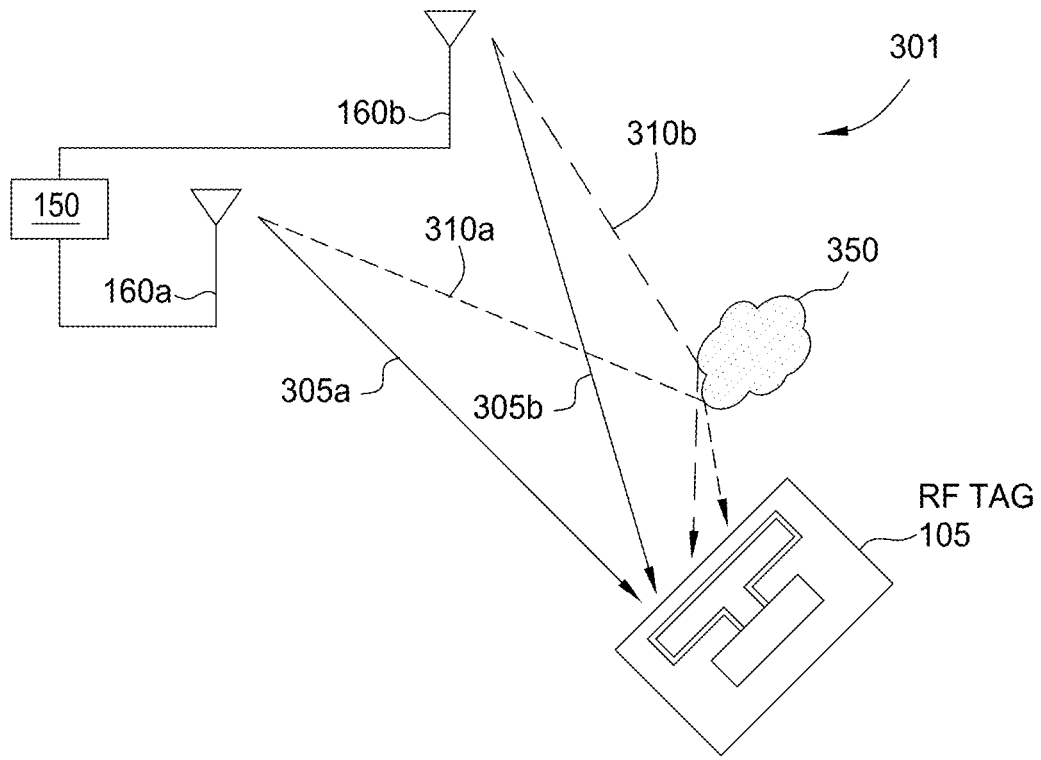

FIGS. 3A-B illustrate an RFID system experiencing multipath signal propagation from multiple antennas, according to one embodiment of the invention. FIG. 3A illustrates multipath signal propagation for one transmitting tag reader antenna $160_a$ in environment 300. As shown, two signals 305, 310 make up the forward link of the backscattering channel. The line-of-sight (LOS) signal 305 illustrates a path directly from the antenna $160_a$ to the RF tag 105. The reflected signal 310, however, illustrates a path from the antenna $160_a$ to the RF tag that results from the signal 310 reflecting off the object 350. For example, an antenna has a radiation pattern that defines the strength of the signal transmitted in the 3-D space surrounding the antenna. If object 350 reflects electromagnetic waves and is within that radiation pattern, then the reflected signal 310 may result.

The location of object 350 may be statically or dynamically changing. Further, the objection may be made up of any material that reflects electromagnetic waves. For example, the object 350 may be a person moving in the environment 300 or a static metal wall in an enclosed room. The environment 300 may include any number of objects 350 as well as any number of reflected signals 310.

The path traversed by the LOS signal 305 and the reflected signal 310 are different, and thus, the signals have different phases. The combined phase of the LOS signal 305 and the reflected signal 310 comprise the phase of the signal received at the RF tag through the forward link of the backscatter channel—i.e., the composite phase of the multipaths. If the phase of the LOS signal 305 and the reflected signal interfere destructively—e.g., the phase of the reflected signal 310 is 180 degrees offset from the phase of the LOS signal 305—then the amplitude of the received signal will be less than the amplitude of either signal at the location of the RF tag 105. However, depending on the paths traversed by the signals 305, 310, the signals may constructively interfere at the location of the RF tag 105 if their phases are substantially similar (e.g., off by an integer multiple of 360 degrees). Moreover, in a dynamically changing environment 300 where one or more objects 350 are moving or entering/leaving the environment 300, the path of the reflected signal 310 may also constantly change. Thus, at one spatial location in the environment 300 the signals 305, 310 may constructively interfere, but after the environment 300 changes, the signals 305, 310 may destructively interfere at that same location (or vice versa).

Figure 8:
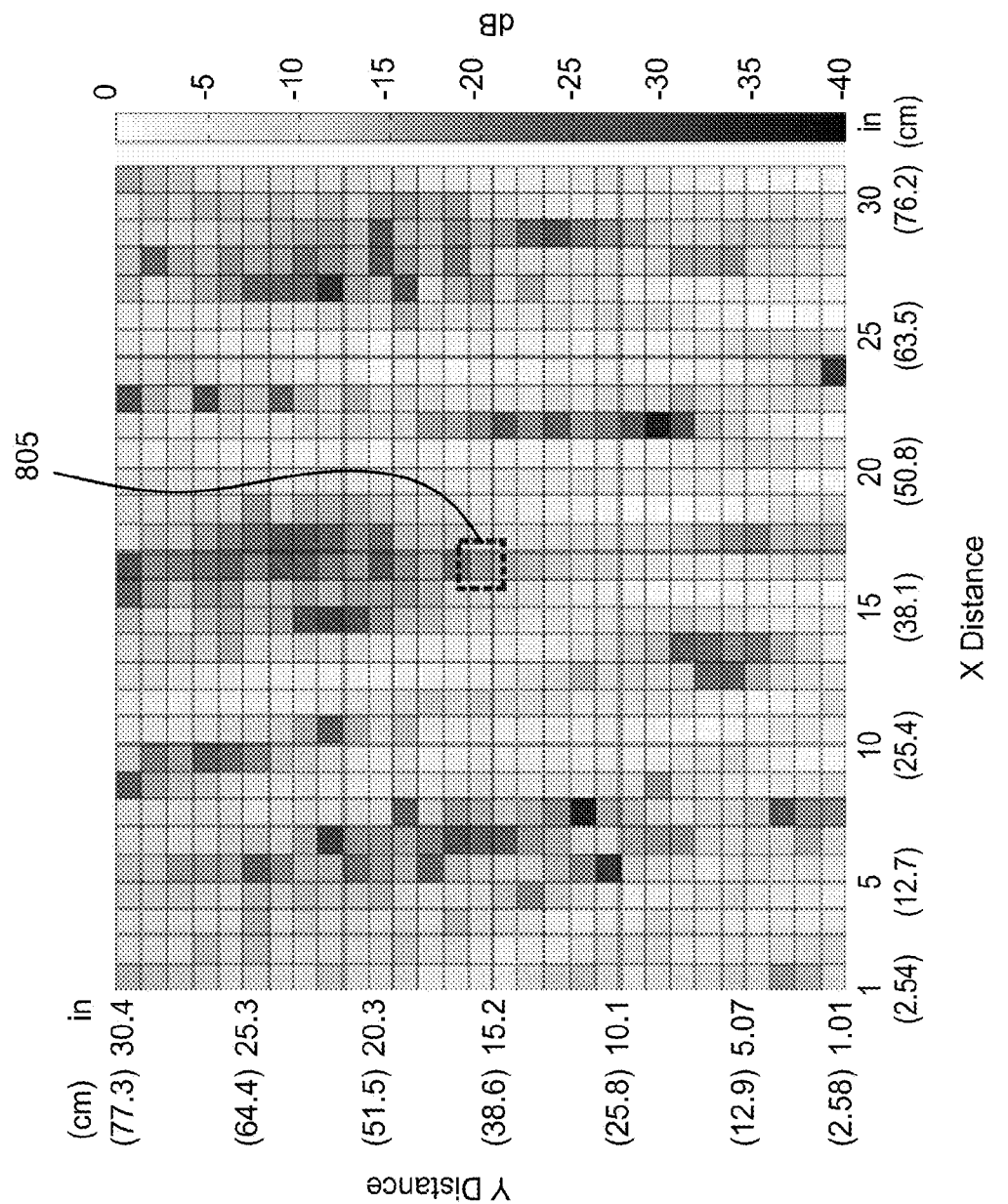
FIG. 8 illustrates experimental results for a tag reader without using transmit diversity, according to one embodiment of the invention.
Figure 9A:
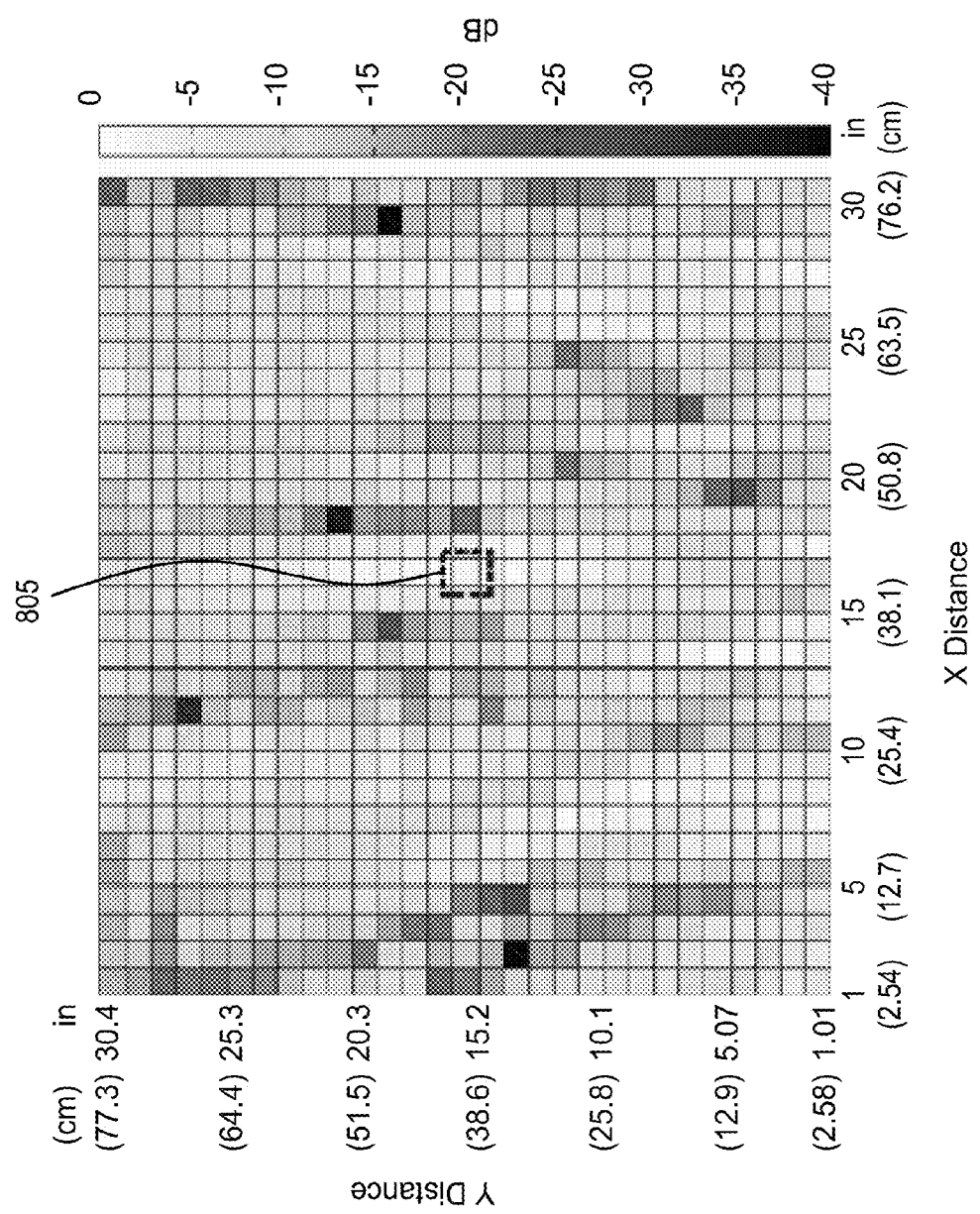
FIGS. 9A-B illustrate experimental results for a tag reader using transmit diversity, according to embodiments of the invention.
Figure 10A:
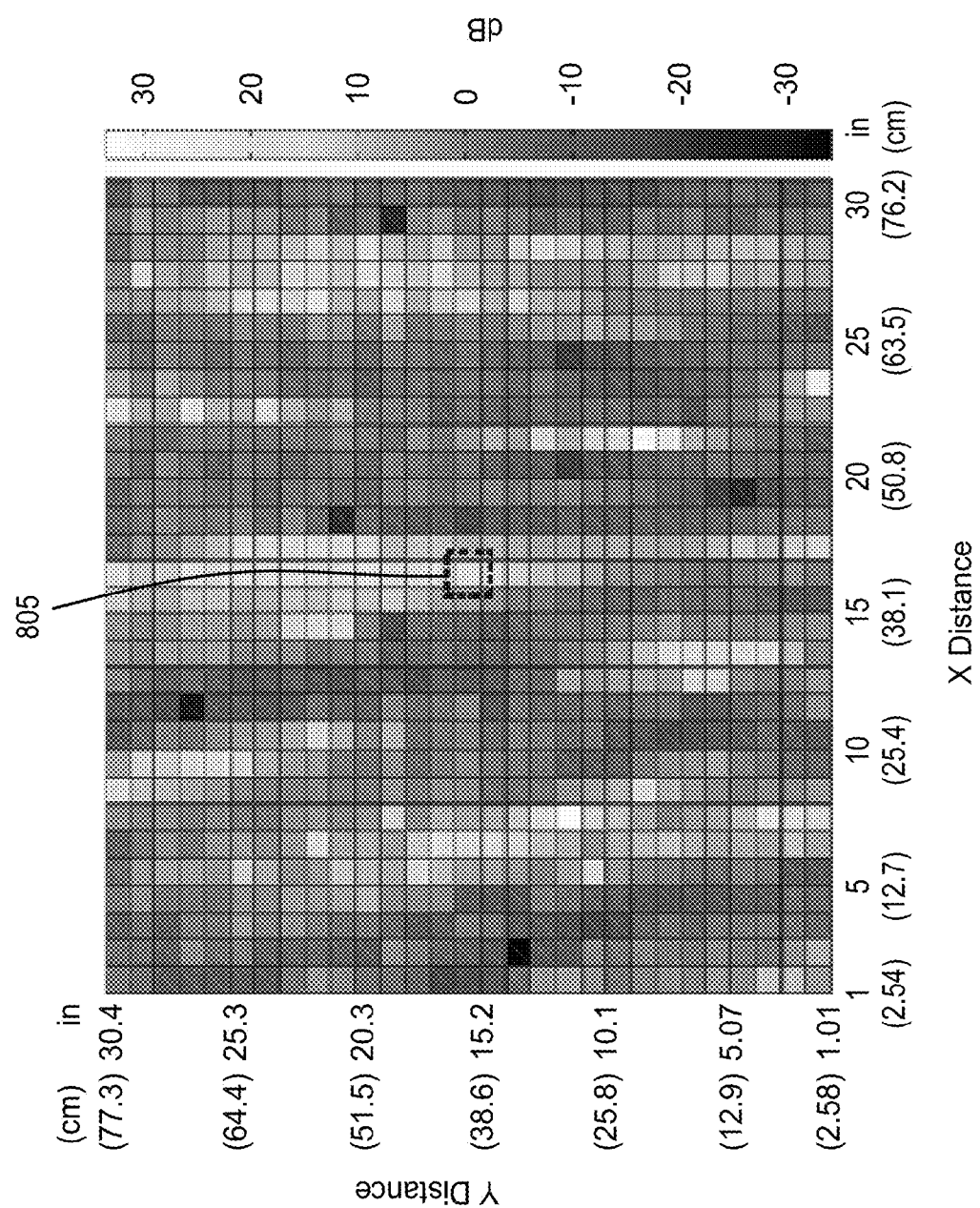
FIGS. 10A-B illustrate experimental results for a tag reader using transmit diversity, according to embodiments of the invention.

Similarly, the objects 350 in the environment 300 may remain fixed but the RF tag 105 may, move. The result would be the same. At one location the multipath signals from multiple antennas may constructively interfere, but at another, the signals may, destructively interfere. In one embodiment, both the objects 350 and the RF tag 105 may be moving in a dynamic environment 300. FIGS. 8, 9A, and 10A show environments where multipath signals from multiple antennas are constructively and destructively interfering such that the power delivered by the transmitted signals varies depending on the spatial location within the environment.

The modulated signal transmitted by the RF tag 105 in response to the forward link signals may also experience multipath signal propagation; however, the effects of this phenomenon will largely be ignored.

FIG. 3B illustrates an environment similar to the environment of FIG. 3A. As shown, the environment 301 includes the antenna $160_a$, RF tag 105, and object 350 in the same positions as in the environment 300. However, the environment 301 further includes a second transmit antenna $160_b$. Moreover, each antenna $160_{a,b}$ includes at least one LOS signal $305_{a,b}$ and at least one reflected signal $310_{a,b}$. Again, depending on the path traversed, the signals 305, 310 may constructively or destructively interfere at the location of the RF tag 105. Thus, at some locations in the environment, the addition of the second antenna $160_b$ to the environment 301 may increase the power delivered to the RF tag 105 compared to the environment 300 in FIG. 3A. However, because of destructive interference, at other locations the opposite may be true.

Transmit diversity may be applied to the two antennas $160_{a,b}$ to ensure that for a given location the signals propagated by the two antennas $160_{a,b}$ constructively interfere. Transmit diversity uses signals that originate from two or more sources (e.g., antennas $160_{a,b}$) that are coherent—i.e., the frequency and phase of the transmitted signals remain constant with respect to each other. However, transmit diversity may vary one of these transmission characteristics at any given instant. Here, the varied transmission characteristic is the phase shift applied to the respective signals. In one embodiment, one or more of the transmitted signals is precoded by the complex conjugate of the backscatter channel to mitigate the effects of multipath fading. However, other antenna diversity schemes may be used to ensure constructive interference at the location of the RF tag 105, such as time-reversal or beam forming. Transmit diversity, time-reversal, and beam forming are closely related concepts as each seeks to create the coherent addition of signals from multiple antennas at a particular spatial location or in a desired direction. In fact, conjugating the channel phase in the frequency domain (i.e., performing transmit diversity) is equivalent to performing time-reversal in the time domain if both the amplitude and phase is adjusted. Accordingly, although the embodiments disclosed below discuss phase shifting the transmitted signals, in one embodiment, the amplitude as well as the phase of the transmitted signal may be altered to increase constructive interference at a desired location.

Moreover, transmit diversity or time-reversal may deliver more power to a specified location relative to a single antenna or multiple antenna RFID system even if the LOS is blocked by an object 350. That is, an RFID system using transmit diversity may be able to communicate with an RF tag 105 relying solely on reflected signals $310_{a,b}$.

In one embodiment, destructive interference may be used advantageously. For example, instead of (or in addition to) relying on constructive interference to increase the power to an RF tag, the system may use destructive interference to selectively eliminate any signals that may emit from RF tags that the system wants to ignore. Thus, the embodiments disclosed herein may use destructive interference to better detect relevant signals.

Unlike other implementations of antenna diversity schemes, transmit diversity may be used without the antennas $160_{a,b}$ being carefully spaced relative to each other as may be required with, for example, a phased array. However, some arrangements of the antennas $160_{a,b}$ may yield better performance than others. Accordingly, the scope of this invention includes these possible arrangements but is not limited to such.

Transmit Diversity

As mentioned previously, the backscatter channel may be divided into a forward link which accounts for signal propagation from the tag reader to the RF tag and the backscatter link which accounts for signal propagation from the RF tag to the tag reader. The static, narrowband, baseband backscatter channel between M reader transmitter antennas, L RF tag antennas, and N reader, receiver antennas may be expressed as $$\tilde{\vec{y}}(\vec{r},t) = 1;2\tilde{H}^b(\vec{r})\tilde{S}(t)\tilde{H}^f(\vec{r})\tilde{\vec{x}}(t) \quad (1)$$

where $\tilde{\vec{y}}(\vec{r}, t)$ is an N×1 vector of received, baseband signals, $\tilde{H}^b(\vec{r})$ is the N×L complex matrix of backscatter link coefficients, and $\tilde{H}^f(\vec{r})$ is the L×M complex matrix of forward link coefficients. $\tilde{S}(t)$ is the RF tag's narrowband L×L signaling matrix, and $\tilde{\vec{x}}(t)$ is an M×1 vector of signals transmitted from the transmitter antennas. The tilde () denotes complex coefficients while the (½) term conserves power when converting equation 1 to the passband representation. With monostatic antennas, the forward and backscatter links are identical. Thus, $\tilde{H}^b(\vec{r}) = \tilde{H}^f(\vec{r})$.

Equation 1 may be reduced based on several assumptions and modifications: (i) the RF tag uses one antenna (i.e., L=1), (ii) the (½) term and the time/spatial dependence are ignored, (iii) an unmodulated tone is transmitted from each reader transmitter antenna—i.e., the entries of $\tilde{\vec{x}}$ are equal ($\tilde{x} = \tilde{x}_1 = \tilde{x}_2 = \ldots = \tilde{x}_M$) and (iv) for monostatic tag readers the phase of each link coefficient is equal ($\angle \tilde{h}_i^f = \angle \tilde{h}_i^b$. Based on these assumptions and modifications, equation 1 reduces to:

$$\begin{bmatrix} \tilde{y}_1 \\ \tilde{y}_2 \\ \vdots \\ \tilde{y}_M \end{bmatrix} = \begin{bmatrix} \tilde{h}_1^b(\tilde{h}_1^f + \tilde{h}_2^f + \ldots + \tilde{h}_M^f) \\ \tilde{h}_2^b(\tilde{h}_1^f + \tilde{h}_2^f + \ldots + \tilde{h}_M^f) \\ \vdots \\ \tilde{h}_M^b(\tilde{h}_1^f + \tilde{h}_2^f + \ldots + \tilde{h}_M^f) \end{bmatrix} \tilde{x} \quad (2)$$

Figure 4:
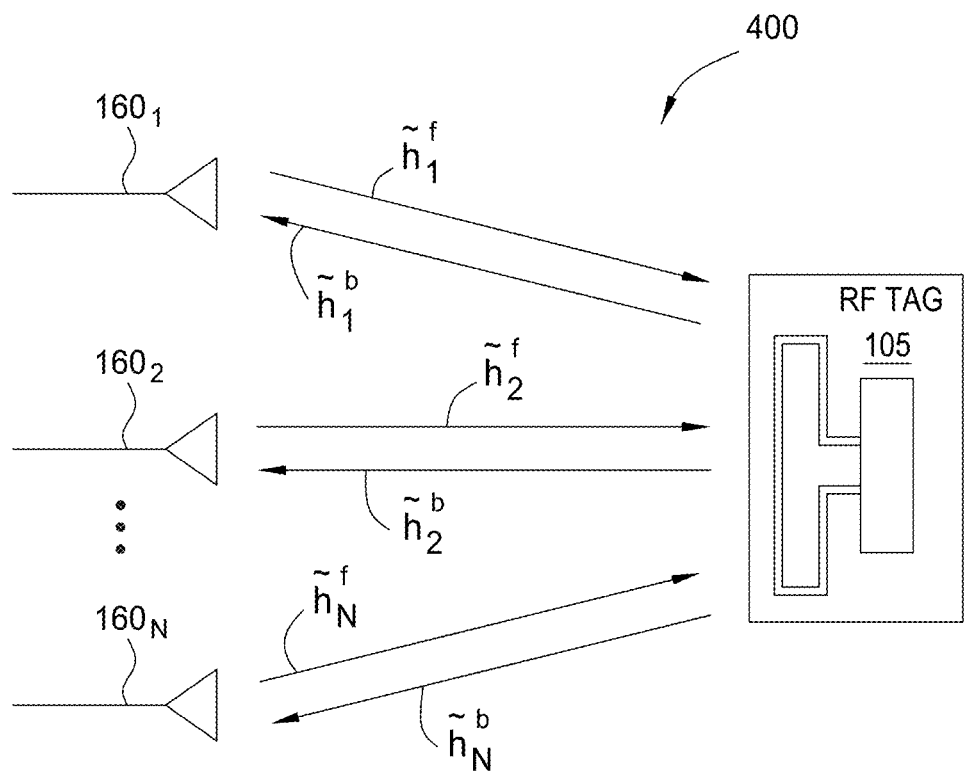
FIG. 4 illustrates an RFID system, according to one embodiment of the invention.

FIG. 4 illustrates an RFID system 400 of equation 2, according to one embodiment of the invention. Each antenna $160_{1-N}$ includes baseband channel coefficients for both the forward link ($\tilde{h}_x^f$) and the backscatter link ($\tilde{h}_x^b$). In general, these coefficients include both the magnitude and phase of the signal propagated through the complete backscatter channel.

Embodiment 1

Figure 5A:
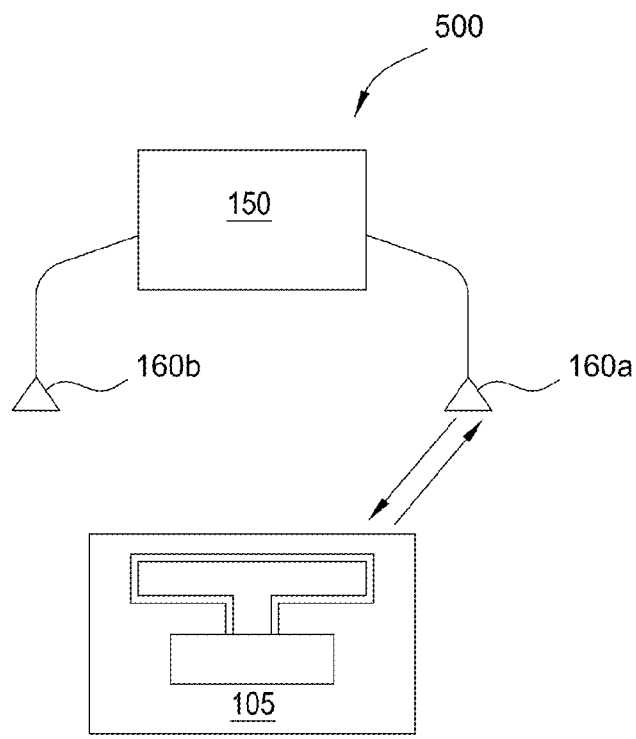
FIGS. 5A-D illustrate an RFID system and method for adjusting the phase of a transmitted signal, for a monostatic tag reader, according to embodiments of the invention.

FIGS. 5A-D illustrate an RFID system and method for adjusting the phase of a transmitted signal, according to embodiments of the invention. FIG. 5A illustrates an RFID system 500 comprising a monostatic tag reader 150 coupled to two antennas $160_{a,b}$. That is, the tag reader 150 both transmits and receives signals via the two antennas $160_{a,b}$. Although only two antennas $160_{a,b}$ are illustrated, the RFID system 500 may include three or more antennas. As shown, the tag reader 150 propagates a signal using antenna 160$_a$ while turning off antenna 160$_b$ (and any other antenna included in the tag reader 150). Alternatively, any signal transmitted by antenna 160$_b$ may be substantially attenuated such that the propagated signal does not contribute to the phase of the backscattered signal. Further, the tag reader 150 uses only antenna 160$_a$—i.e., the same antenna that propagates the signal—to receive the modulated signal from the RF tag 105.

Figure 5B:
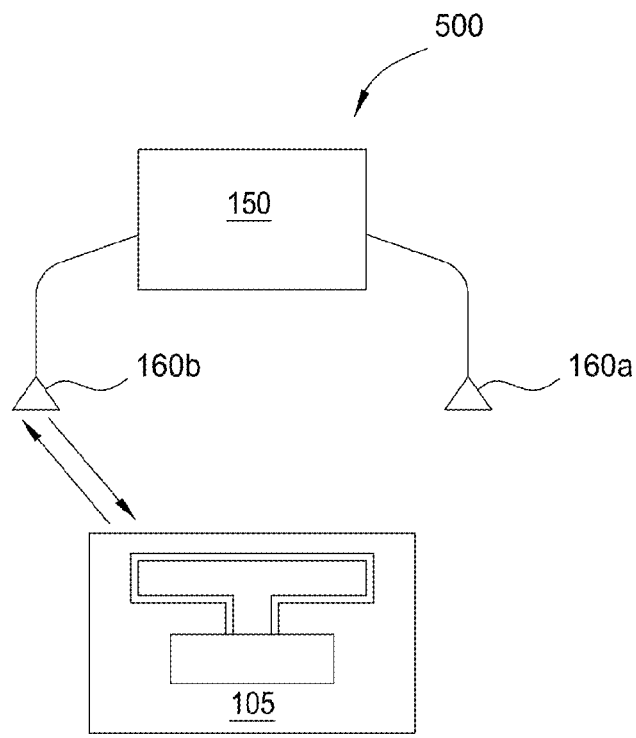

FIG. 5B illustrates the RFID system 500 at a later time than FIG. 5A. At this later time, the monostatic tag reader 150 propagates a pilot signal via antenna 160$_b$ while simultaneously turning off (or substantially attenuating) any signals transmitted by other antennas in the tag reader 150. Antenna 160$_b$ is then used to receive the modulated signal from the RF tag 105. Note that FIGS. 5A and 5B show only the direct path between the tag reader 150 and RF tag 105; however, these arrows are intended to represent the combined effect of any multipath signals that may make up the respective forward links.

The static, narrowband, baseband backscatter channel between a reader antenna—e.g., antenna 160$b$ or 160$a$—and an RF tag antenna is $$\tilde{y}(\vec{r}) = \tilde{h}^b(t)\tilde{h}^f(\vec{r})\tilde{x} \quad (3)$$

where $\tilde{y}(\vec{r})$ is the baseband output of the receiver; $\tilde{x}$ is the baseband continuous wave (CW) transmitted signal; $\tilde{\Gamma}(t)$ is the reflection coefficient at the tag antenna terminals and $\tilde{h}^b$ and $\tilde{h}^f$ are baseband channel coefficients for both the forward link and the backscatter link. Moreover, these baseband channel coefficients represent the combined effects of all the multipath signals propagating in the complete backscatter channel associated with each antenna. If the reflection coefficient of the RF tag and the transmitted signal are known, then the product of the forward and backscatter links ($\tilde{H}$) can be extracted from the measured signal:

$$\tilde{H} = H\exp(j\theta) = \tilde{h}^b(\vec{r})\tilde{h}^f(\vec{r}) \quad (4)$$

In equation 4, H and θ are the amplitude and total phase delay, respectively, of the complete backscatter channel. For a monostatic reader (such as the one shown in FIGS. 5A-B), it can be assumed that the forward and backscatter links are the same. Thus, the following relationship between the phase delays of the forward and backscatter links can be made:

$$\angle \tilde{h}^b(\vec{r}) = \angle \tilde{h}^f(\vec{r}) = \theta/2 \quad (5)$$

Equation 5 illustrates that for monostatic tag readers, the total phase delay measured for the complete backscatter channel can be divided in half to yield the phase delay associated with either the forward or backscatter links. There may be some addition phase delay caused by the antenna and circuitry on the RF tag but these contributions are ignored in this disclosure.

Figure 5C:
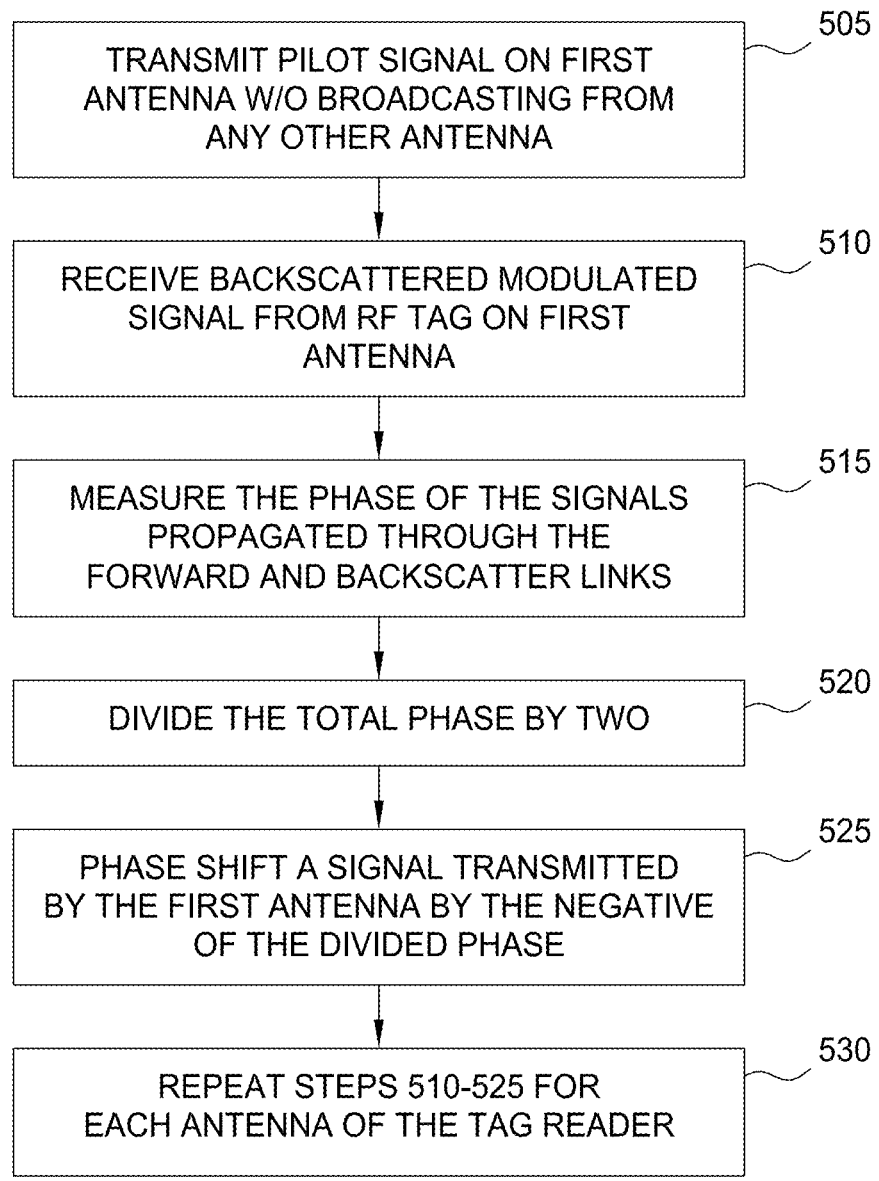

FIG. 5C is a flow chart illustrating a technique for phase shifting transmitted signals in the RFID system 500 to generate constructive interference at a location of the RF tag 105. At step 505, the tag reader 150 transmits a pilot signal on the first antenna 160$_a$. Further, all other antennas in the tag reader 150 may be turned off or substantially attenuated (e.g., 50 dB relative to the transmitted signal) during steps 505 and 510. At step 510, the antenna 160$_a$ then receives the modulated signal from the RF tag 150.

Because the pilot signal and reflection coefficient are known, equation 4 represents the modulated signal received at the tag reader 150. At step 515, the tag reader 150 measures the phase (θ) of, the signal propagated through the backscatter channel. For example, the phase delay module 165 may calculate the phase from the received modulated signal ($\tilde{H}$). The phase delay module 165 may then divide the phase in half (θ/2). Alternatively, the tag reader 150 may relay the received modulated signal to an external computing device for calculating the phase. As shown by equation 5, the total phase divided by two equals the phase delay resulting from the transmitted signal propagating in the forward link. At step 525, a transmitter 155 associated with antenna 160$_a$ may then phase shift any subsequently transmitted signals from the antenna 160$_a$ by the negative of the divided phase. This process compensates for any phase delay that may be introduced in the forward link.

In one embodiment, at step 530, steps 510-525 may be repeated for each antenna of the monostatic tag reader 105. That is, the tag reader 105 shifts a subsequent signal transmitted by other antennas 160 by the phase delay associated with the forward link of each of the antennas. For example, FIG. 5B illustrates determining the phase delay associated with the forward link of antenna 160$_b$. Specifically, antenna 160$_b$ transmits a pilot signal with the same frequency as that transmitted by antenna 160$_a$ and divides the total measured phase by two. By accounting for the phase delay for each of the forward links, the tag reader 150 ensures that the combined multipath signals transmitted by each of the antennas 160 arrive at the location of the RF tag 150 with the same phase, and thus, will constructively interfere such that the power delivered to the RF tag 150 is increased.

In one embodiment, the phase delay module 165 may consider whether the total phase is a wrapped or unwrapped phase. An unwrapped phase ($\bar{\theta}$) is equivalent to the total phase (θ) generated by the signals propagating in the backscatter channel (i.e., from the antenna to the RF tag 105 back to the antenna). Examples of a unwrapped phase may be 90 degrees, 400 degrees, 900 degrees, etc. However, in one embodiment, the phase delay module 165 may measure only the wrapped phase of the received signals which is limited to 0-360 degrees. Because the phase repeats every 360 degrees, or 2π radians, a measured wrapped phase $\hat{\theta}$ is related to an unwrapped phase $\bar{\theta}$ by:

$$\hat{\theta} = \bar{\theta} + 2k\pi, \text{ where } k = 0, -1, -2, \ldots \quad (6)$$

Substituting equation 6 into equation 5 yields the wrapped forward link phase delay $\hat{\theta}^f$.

$$\hat{\theta}^f = \frac{\bar{\theta}}{2} + k\pi \quad (7)$$

Note that because equation 6 is divided by two, the offset is no longer defined by 2kπ but is instead kπ. This means the wrapped phase yields an unknown π offset. If, for example, the offset of the two antennas 160$_{a,b}$ ($k_1 - k_2$) is even (e.g., 0, 2π, 4π, etc.) then the signals add constructively. But if the offset $k_1 - k_2$ is odd (e.g., 0, π, 3π, etc.) the signals add destructively at the location of the RF tag 105.

Figure 5D:
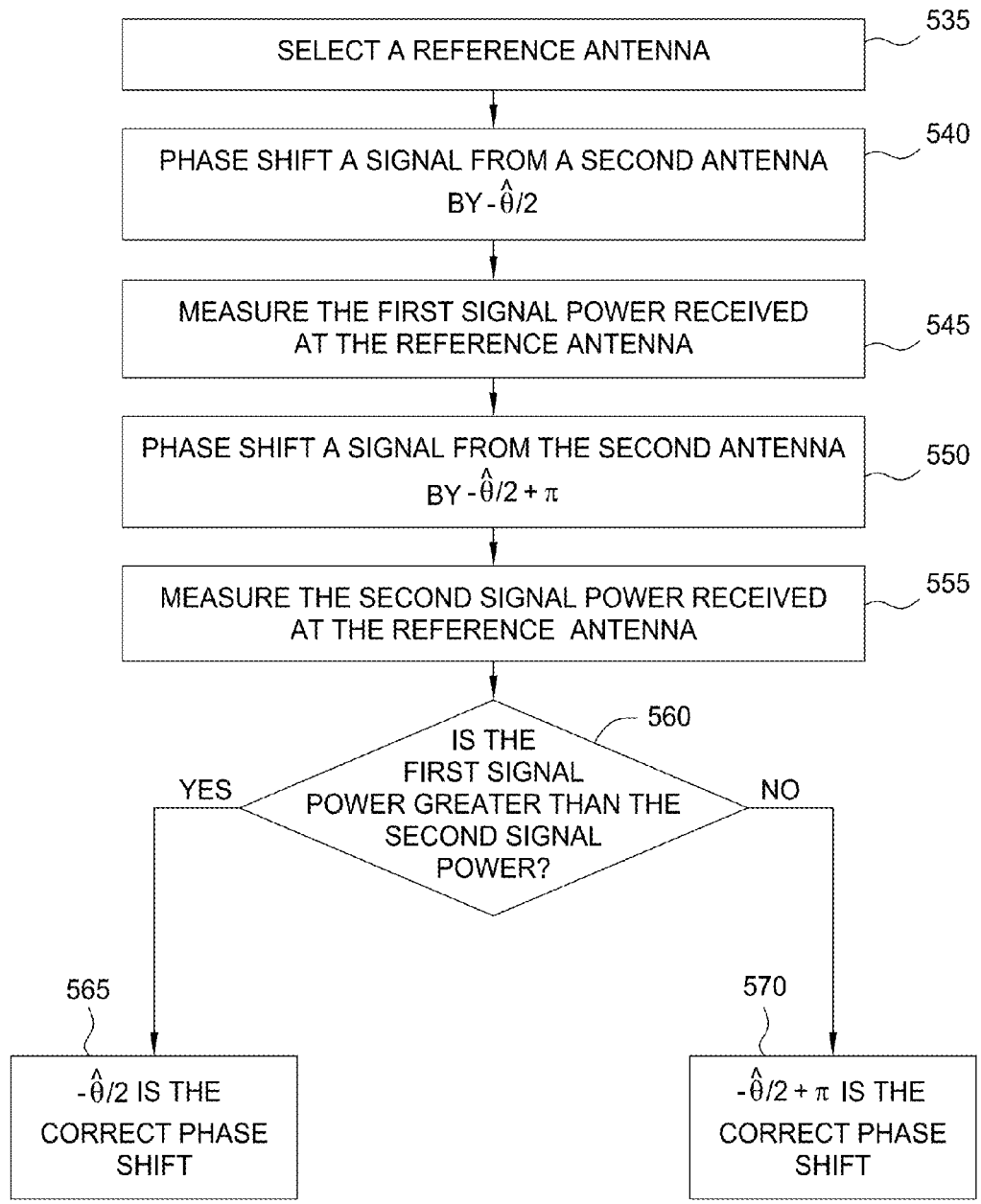

FIG. 5D illustrates a technique for ensuring that transmitted signals constructively interfere using a wrapped phase, according to one embodiment of the invention. At step 535, the tag reader 150 selects a reference antenna (e.g., antenna 160$_a$). At step 540, the phase delay module 165 uses the phase delay found using the method described in FIG. 5C to shift a first signal transmitted by a second antenna (e.g., antenna 160$_b$). Specifically, the measured phase (θ) is divided in half to yield the phase delay associated with the forward link as described in equation 5. If the phase delay is a wrapped delay, at step 545 the tag reader 150 uses the reference antenna 160$_a$ to receive the modulated signal (if any) generated in response to the first transmitted signal. The tag reader 150 records the power associated with the received signal.

At step 550, the tag reader 150 transmits the same signal on the second antenna 160b except that the measured phase associated with the forward link is further shifted by π or 180 degrees. At step 555, the reference antenna 160$_a$ receives the modulated signal (if any) generated in response to the second transmitted signal.

At step 560, if the power associated with the first signal is greater than the power associated with the second signal, then the phase delay module 165 knows that the offset between the reference and second antennas 160$_{a,b}$ is even—i.e., the signals constructively interfere (i.e., step 565). Accordingly, the phase shift applied in step 540 is the correct phase shift. If not, then the offset between the offset between the reference and second antennas 160$_{a,b}$ is odd (i.e., the signal destructively interfere) and the phase shift applied in step 550 is the correct phase shift (i.e., step 570). This process may be repeated for all the transmit antennas of the monostatic tag reader 150 using the same reference antenna 160$_a$. In this manner, whether the offset is odd or even, the phase delay module 165 applies the phase shift necessary to ensure the transmitted signals of the plurality of transmit antennas constructively interfere at the location of the RF tag 105.

Embodiment 2

Figure 6A:
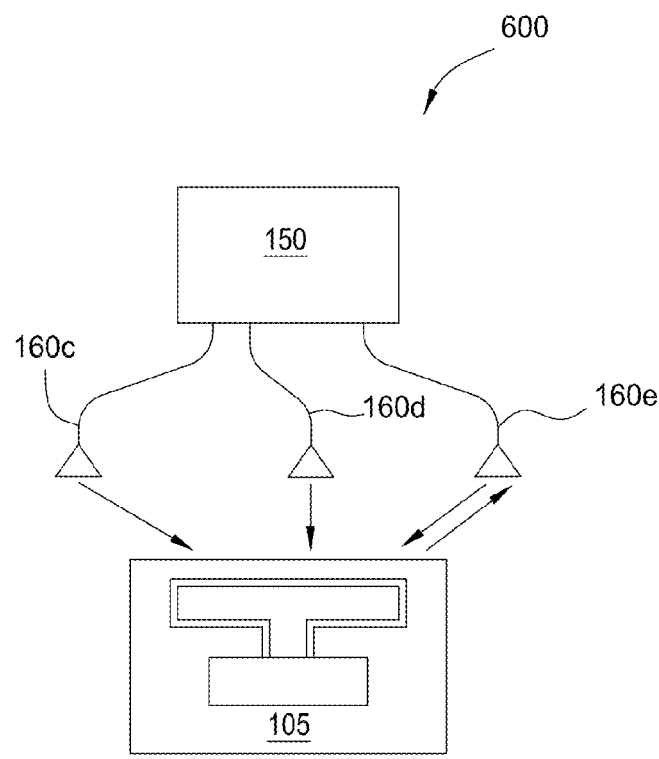
FIGS. 6A-C illustrate an RFID system and method for adjusting the phase of a transmitted signal for a monostatic tag reader, according to embodiments of the invention.
Figure 6B:
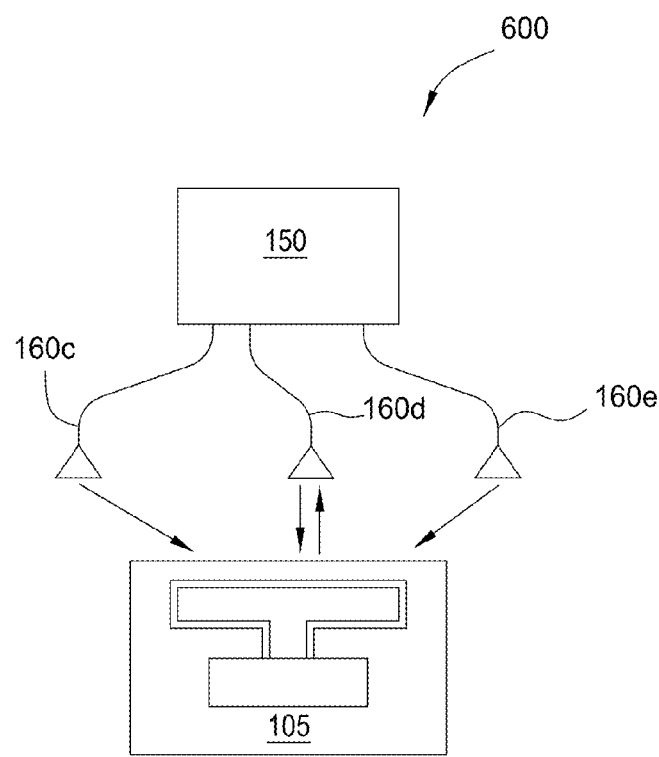
Figure 6C:
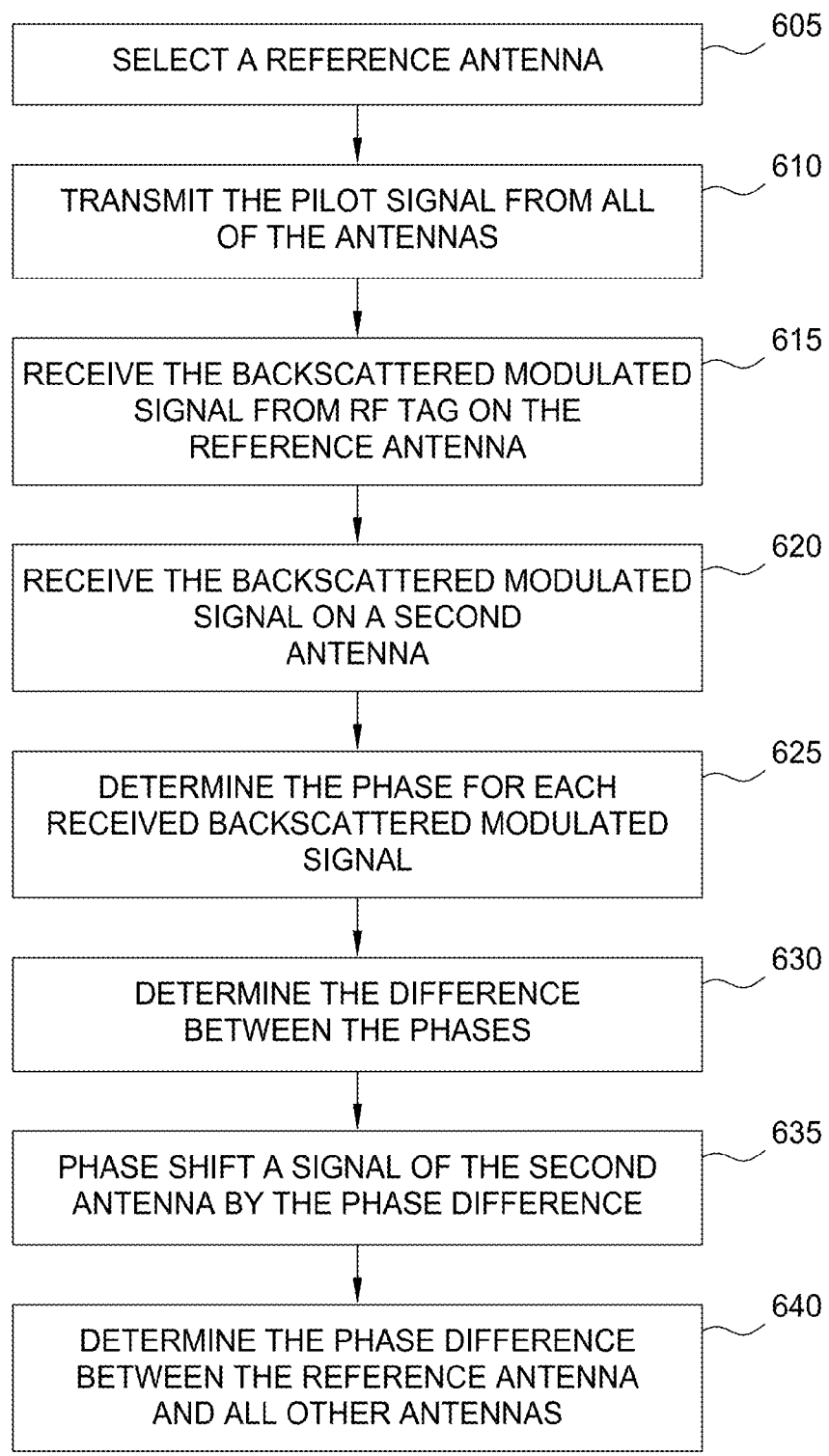

FIGS. 6A-C illustrate an RFID system and method for adjusting the phase of a transmitted signal, according to embodiments of the invention. FIG. 6A illustrates an RFID system 600 with a monostatic tag reader 150 that includes three TX/RX antennas 160$_{c-e}$. Moreover, at the instance of time illustrated in FIG. 6A, all the antennas of the monostatic tag reader 150 are transmitting the pilot signal; however, the tag reader 150 is only receiving the modulated signal on only one of the antennas 160$_e$—i.e., the reference antenna. That is, all of the forward links associated with each of the antennas 160 contribute a phase delay, but only the phase delay associated with the backscatter link of the reference antenna 160$_e$ is included in the composite phase delay.

FIG. 6B illustrates the RFID system at a different instance of time. As shown, all of the antennas still transmit the pilot signal but the modulated signal is received only on a second, different antenna 160$_d$.

Instead of measuring the phase delay attributable to the forward link associated with each individual antenna, the phase of each transmitted signal may be shifted to match the phase delay difference of the forward link associated with the reference antenna. From equation 4, the received signal at the i$^{th}$ antenna when all the antennas are transmitting simultaneously is:

$$\tilde{y}_i = \tilde{h}_i^b (\tilde{h}_1^f + \tilde{h}_2^f + \ldots + \tilde{h}_M^f) \tilde{x} \tilde{s} \tag{8}$$

For example, $\tilde{y}_i$ of equation 8 may be measured at the reference antenna 160$_e$ at time 1 (i.e., $\tilde{y}_{160e}$) and at antenna 160$_d$ at a later time 2 (i.e., $\tilde{y}_{160d}$) or simultaneously. Subtracting the phase information yields the total phase difference (Δ) between the reference antenna 160$_e$ and the second antenna 160$_d$.

$$\Delta = \angle \tilde{y}_{160e} - \angle \tilde{y}_{160d} \tag{9}$$

$$\Delta = \angle \tilde{h}_{160e}^b + \angle(\angle \tilde{h}_{160c}^f + \angle \tilde{h}_{160d}^f + \angle \tilde{h}_{160e}^f) - \angle \tilde{h}_{160d}^b + \angle (\angle \tilde{h}_{160c}^f + \angle \tilde{h}_{160d}^f + \angle \tilde{h}_{160e}^f)) \tag{10}$$

Because each antenna 160 has common phase information)) (i.e., $\angle(\angle \tilde{h}_{160c}^f + \angle \tilde{h}_{160d}^f + \angle \tilde{h}_{160e}^f)$) and because $\angle \tilde{h}_i^b = \angle \tilde{h}_i^f$ for a monostatic tag reader 150, equations 9 and 10 reduce to:

$$\Delta = \angle \tilde{h}_{160e}^f - \angle \tilde{h}_{160d}^f \tag{11}$$

Thus, subtracting the measured total phase of the system shown in FIG. 6A from the measured total phase of the system in FIG. 6B is equivalent to subtracting the phase delay attributable to the forward links of reference antenna 160$_e$ ($\angle \tilde{h}_{160e}^f$) and antenna 160$_d$ ($\angle \tilde{h}_{160d}^f$).

FIG. 6C is a flow chart for performing transmit diversity for a monostatic reader, according to one embodiment. At step 605, the tag reader 150 selects a reference antenna—i.e., antenna 160$_e$. At step 610, the tag reader 150 transmits the pilot signal from all of the antennas, but at step 615, the modulated signal ($\tilde{y}_{160e}$) is received only at the reference antenna 160$_e$. Alternatively, the tag reader 150 may attenuate any modulated signal received on the other antennas 160$_{c,d}$—e.g., 50 dB relative to the signal received on the reference antenna 160$_e$.

While all the antennas 160 are transmitting the pilot signal, at step 620, the tag reader 150 may filter out or attenuate the signal received by the reference antenna 160$_e$ and instead measure the received modulated signal ($\tilde{y}_{160d}$) from a second, different antenna—e.g., antenna 160$_d$. In another embodiment, the tag reader 150 may use a RF or microwave switch to select the antennas.

At step 625, the phase delay module 165 may measure the composite phase of the signals associated with the two backscatter channels shown in FIGS. 6A and 6B—i.e., $\angle \tilde{y}_{160e}$ and $\angle \tilde{y}_{160d}$. At step 630, the phase delay module 165 may then subtract the composite phase delays. As shown by equation 10, subtracting the composite phase delays is synonymous to subtracting the phase delays of the respective backscatter links of the reference and second antennas 160$_{e,d}$. This principle is illustrated visually by comparing FIGS. 6A and 6B. At each instance of time, the forward links for the backscatter channels are the same. Thus, the contribution of the phase delay by each of the forward links (i.e., $\angle(\tilde{h}_{160c}^f + \tilde{h}_{160d}^f + \tilde{h}_{160e}^f)$) cancels out when the total phase delays are subtracted. Moreover, because the phase delays from backscatter links for antenna 160$_{d,e}$ equal the phase delays for the forward links, this substitution may be made to result in equation 11.

At step 630, the phase delay module 165 may phase shift any subsequent signal transmitted by the second antenna 160$_d$ by the phase difference. In this manner, any signal transmitted by the second antenna 160$_d$ has the same phase at the RF tag as the phase at the RF tag of the reference antenna 160$_e$.

Further, at step 640, steps 620—635 may be repeated for all other antennas in the tag reader 150. For example, while all antennas are transmitting the pilot signal, the tag reader 150 may measure the received modulated signal at the third antenna 160$_c$ ($\tilde{y}_{160c}$). Note that steps 605-615 may be skipped since the tag reader 150 has presumably already measured the received modulated signal using the reference antenna 160$_a$. The phase delay module 165 may subtract the composite measured phase on the third antenna 160$_c$ ($\angle \tilde{y}_{160c}$) from the composite measured phase of the reference antenna 160$_e$ ($\angle \tilde{y}_{160e}$), thereby yielding the phase delay difference between the respective forward links. Phase shifting the third antenna 160$_c$ by the negative of the phase difference ensures that the combined multipaths signals transmitted from the third antenna 160 arrive with the same phase at the RF tag 105 as the combined multipaths signal transmitted by the reference antenna 160$_e$. In this manner, the combined multipath signals attributable to each of the second and third antennas $160_{d,c}$ have the same phase as that of the reference antenna $160_e$ and add constructively at the spatial location of the RF tag 105.

Because Embodiment 2 phase shifts the antenna without dividing the total measured phase delay by two, Embodiment 2 avoids the wrapped phase check associated with Embodiment 1.

Embodiment 3

Figure 7A:
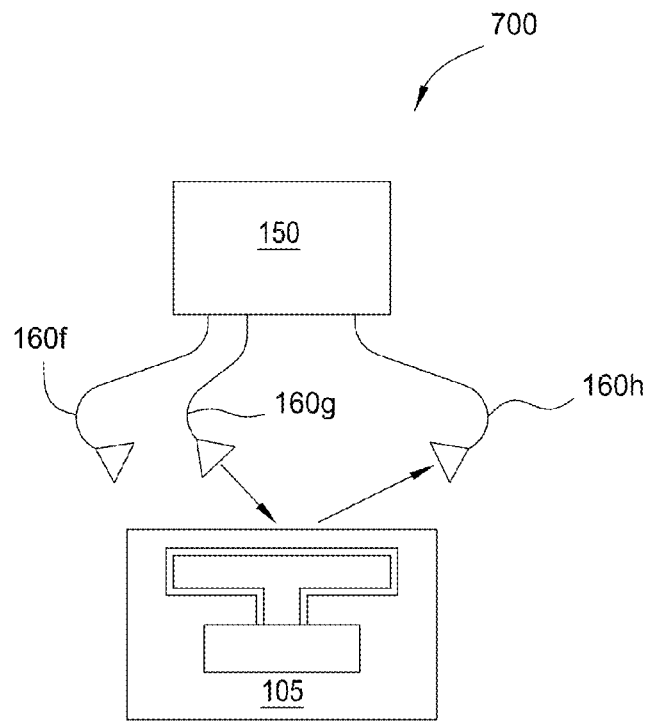
FIGS. 7A-C illustrate an RFID system and method for adjusting the phase of a transmitted signal for a bistatic tag reader, according to embodiments of the invention.
Figure 7B:
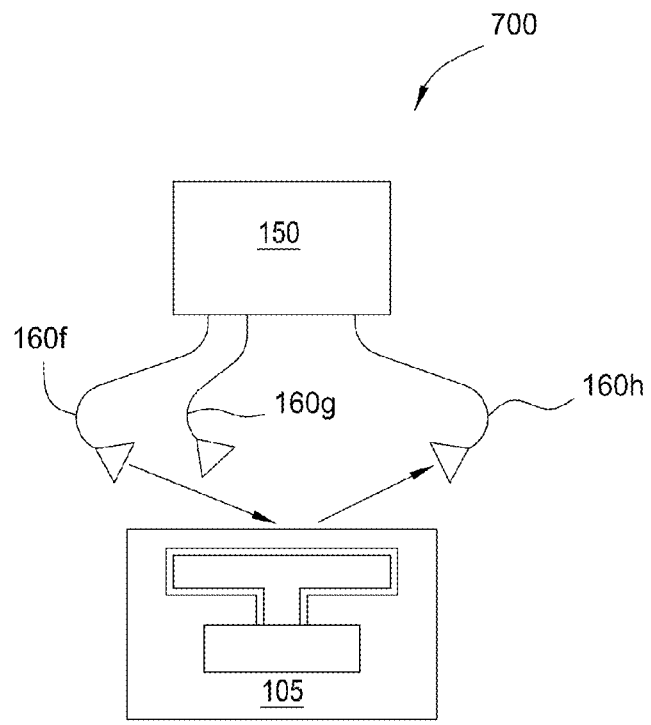
Figure 7C:
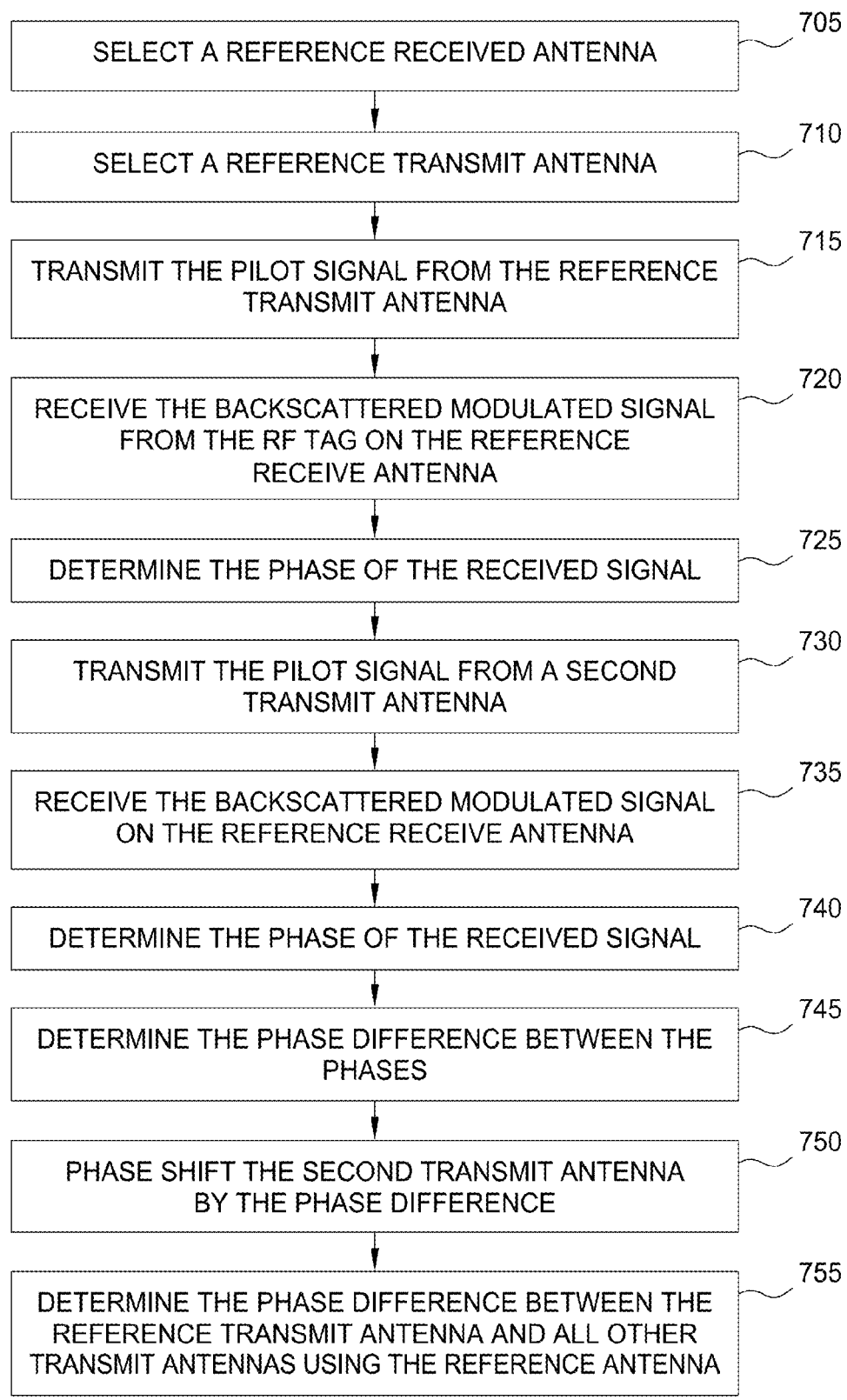

FIGS. 7A-C illustrate an RFID system and method for adjusting the phase of a transmitted signal, according to embodiments of the invention. FIG. 7A shows an RFID system 700 that includes a bistatic tag reader 150 with at least two transmit antennas $160_{f,g}$ and at least one receive antenna $160_h$. At the particular instance of time shown in FIG. 7A, the transmit antenna $160_g$—i.e., the reference transmit antenna— transmits a pilot signal to RF tag 105 which is then modulated and received at receive antenna $160_h$—i.e., the reference receive antenna. FIG. 7B illustrates that same RFID system 700 except at a different instance of time where transmit antenna $160_f$ transmits a pilot signal with at least the same frequency as the earlier pilot signal to RF tag 105 which is then modulated and received at receive antenna $160_h$.

With a bistatic tag reader 150, the assumption that $\angle \tilde{h}_i^b = \angle \tilde{h}_i^f$ may not be true since the tag reader 150 uses two antennas at two different locations to transmit and receive signals. Nonetheless, constructive interference at the spatial location of the RF tag 105 may be obtained if the channel between two transmit antennas and a single receiver antenna is measured.

$\tilde{y}_{160h,160g}$ is the signal received at the reference receive antenna $160_h$ when only transmit antenna $160_g$ is transmitting the pilot signal and $\tilde{y}_{160h,160f}$ is the signal received at the reference receive antenna $160_h$ when only transmit antenna $160_f$ is transmitting the pilot signal, then the phase difference between the total phase of the two signals may be expressed as:

$$\Delta = \angle \tilde{y}_{160h,160g} - \angle \tilde{y}_{160h,160f} \quad (12)$$

$$\Delta = (\angle \tilde{h}_{160g} + \angle \tilde{h}_{160h}) - (\angle \tilde{h}_{160f} + \angle \tilde{h}_{160h}) \quad (13)$$

Because the composite phases for the two signals have common phase information—i.e., $\angle \tilde{h}_{160h}^b$—equations 12 and 13 further reduce to:

$$\Delta = \angle \tilde{h}_{160g}^f - \angle \tilde{h}_{160f}^f \quad (14)$$

Thus, subtracting the measured composite phases of the systems shown in FIGS. 7A and 7B is the equivalent of subtracting the phase delays attributable to the forward links of the two transmit antennas $160_{f,g}$.

FIG. 7C is a flow chart illustrating a technique of using transmit diversity with the bistatic tag reader 150 to ensure constructive interference at the location of the RF tag 105. At step 705 and 710, the tag reader selects a reference receive antenna—i.e., antenna $160_h$—that receives the modulated signal from the RF Tag 105 and a reference transmit antenna—i.e., antenna $160_g$—for transmitting the pilot signal.

At step 715, the tag reader 150 transmits the pilot signal from the reference transmit antenna $160_g$ with the other transmit antennas either turned off or substantially attenuated. Similarly, at step 720 the tag reader receives the modulated signal ($\tilde{y}_{160h,160g}$) from the RF tag 105 at the reference receive antenna $160_h$ while the other received signals of different receive antennas (if any) are ignored. This setup is illustrated in FIG. 7A.

At step 725, the phase delay module 165 measures the composite phase of the received signal ($\angle \tilde{y}_{160h,160g}$) which includes the phase delay from the forward link of antenna $160_g$ and backscatter link of antenna $160_h$.

At step 730, the tag reader 150 turns off or attenuates the pilot signal being transmitted from the reference transmit antenna $160_g$ and instead transmits the pilot signal from the second transmit antenna $160_f$. This scenario is illustrated in FIG. 7B. However, the same reference receive antenna $160_h$ is used to receive the modulated signal when both the reference transmit antenna $160_g$ and the second transmit antenna $160_f$ are transmitting.

At step 735, the phase delay module 165 measures the composite phase of the received signal ($\angle \tilde{y}_{160h,160f}$). This phase, at step 745, is subtracted from the composite phase measured in step 725—i.e., the phase delay from the backscatter channel shown in FIG. 7A. Equation 14 illustrates that doing so yields the phase difference ($\Delta$) between the multipath signals transmitted in the forward link associated with antenna $160_g$ and the multipath signals transmitted in forward link associated, with antenna $160_f$. Moreover, this principle is illustrated visually by comparing FIGS. 7A and 7B. At each instance of, time, the backscatter links for the two backscatter channels are the same. That is, in each, scenario the modulated signal propagates from the RF tag 105 to the reference receive antenna $160_h$. Thus, the contribution of the phase delay by each of the backscatter Jinks (i.e., $\angle \tilde{h}_{160h}^b$) cancels out when the total phase delays are subtracted.

At step 750, the phase delay module 165 may, shift any subsequently transmitted signals from the second transmit antenna $160_f$ by the phase difference. Accordingly, the combined multipath signals transmitted by the second transmit antenna $160_f$ arrive with the same phase as the combined multipath signals transmitted by the reference transmit antenna $160_g$ and the signals constructively interfere at the location of the RF tag 105.

Moreover, at step 755, the technique may be repeated for any other transmit antennas coupled to the tag reader 150. That is, the tag reader 150 may repeat steps 730-745 for each transmit antenna such that it too transmits signals that will arrive at the RF tag 105 with the same phase as the reference transmit antenna $160_f$.

Like with Embodiment 2, Embodiment 3 avoids the wrapped phase check associated with Embodiment 1.

In one embodiment, a bistatic tag reader may use either Embodiment 1 or Embodiment 2 if $\angle \tilde{h}_i^f \cong \angle \tilde{h}_i^f$ is true. For example, if the distance from the tag reader to the RF tag is much greater than the distance between the transmit antennas, then the monostatic techniques discussed in Embodiments 1 and 2 may be used for a bistatic tag reader.

In one embodiment, the methods described in FIGS. 5C-D, 6C, and 7C may be repeated at a predetermined interval to update the phase shift needed so that the multipaths signals from each transmit antenna continue to constructively interfere at the location of the RF tag 105. As discussed previously, a dynamically changing environment changes the different reflected and LOS signals of multipath signal propagation resulting from multiple antennas. In order to adapt to the changed environment, the disclosed embodiments may continually determine the correct phase shift for each transmit antenna. Preferably, the tag reader updates the phase shift faster than the environment is able to change; for example, the techniques described in FIGS. 5C-D, 6C, and 7C repeat every 0.1-1000 milliseconds.

In Embodiments 1-3, the tag reader 150 establishes communication with the RF tag 105 by first receiving a modulated signal. This modulated signal is then used by the phase delay module 165 to determine the necessary phase shift or delay for a transmitted signal. In order to determine the correct phase shift, the tag reader 150 receives a signal from the RF tag 105, which implies that a passive or semi-passive backscattering RF tag 105 is currently in a location where the delivered power from the transmitted signals exceeds the required threshold. Nonetheless, transmit diversity may assist in maintaining communication with the RF tag 105 if the location of the tag is dynamically changing within the environment. That is, the tag may move into a spatial location where, in the absence of transmit diversity, the delivered power would not be sufficient to communicate with the RF tag. Moreover, the objects within the environment may be dynamically moving and constantly generating different multipath signals from multiple antennas. This alters the power delivered at each spatial location. In one embodiment, the techniques disclosed in Embodiments 1-3 may be repeated to update the phase information faster than the environment changes. In this manner, the tag reader 150 may maintain communication with the RF tag 105 in a dynamic environment.

Further, the location of the RF tag 105 may be at the boundaries of the read zone of the tag reader 150. Performing the methods disclosed above, the tag reader 150 may extend the range of the antennas such that the signals constructively interfere at the location of the RF tag 105 to establish communication that is more reliable relative to not, using transmit diversity.

Also, for some RF tags 105, there may be two power thresholds: one threshold for initiating backscatter communication, and a second, higher threshold for powering different circuits on the tag 105. Accordingly, the signals transmitted by the tag reader 150 without transmit diversity may deliver enough power for the RF tag to generate a modulated, backscattered signal but not enough to power the additional circuitry on the tag 105. With transmit diversity, however, the power delivered at the location of the RF tag 105 may be sufficient to exceed the second threshold and thus power the additional circuitry.

Moreover, Embodiments 1-3 may also include a detection process where the tag reader 150 randomly or systematically changes the phases of the transmitted pilot signals before initiating communication with the RF tag 105 such that the multipath signals for each antenna constructively interfere at different spatial locations within the radiation pattern of the antenna array. Destructive interference reduces the power that the signals are able to deliver at a particular spatial location in the radiation pattern. By phase shifting the pilot signals, the tag reader 150 changes how the multipath signals from the multiple antennas interfere at each spatial location. Even without any knowledge of the environment or the current location of the RF tag, changing the phase shift also changes how the signals interfere at each spatial location. With this technique, each time the phase shift is altered, the power delivered to a particular spatial location may either increase, decrease, or stay the same. However, if the tag reader 150 cycles through the possible phase shifts faster than the environment changes, then it is likely that at least one of the phase shifts will increase the power delivered to a spatial location such that the delivered power exceeds the threshold necessary for backscatter communication.

For example, if the RF tag 105 enters the radiation pattern of the antenna array where the multipath signals destructively interfere such that the delivered power at that spatial location is below the necessary power threshold, the tag reader 150 may randomly or systematically phase shift the transmitted pilot signals until one of the shifts delivers power sufficient to initiate backscatter communication. In one embodiment, the tag reader 150 may change the phase shift of the transmitted pilot signals based on the time needed to initiate communication with the RF tag—e.g., less than 10 milliseconds. That is, during the detection process, the tag reader 150 changes the phase shift at a rate that is greater than the time required to receive the modulated, backscattered signal from the RF tag 105.

EXPERIMENTAL RESULTS

FIG. 8 illustrates experimental results of a tag reader with a plurality of transmit antennas without transmit diversity. That is, the amplitude and phase of the signal transmitted by each antenna were the same. The shade of each square represents the normalized power measured at the x-y location corresponding to the lower left corner of each square. For this experiment, the tag reader was monostatic and included four TX/RX antennas. The box 805 indicates the spatial location of the RF tag in the x-y plane.

Figure 9B:
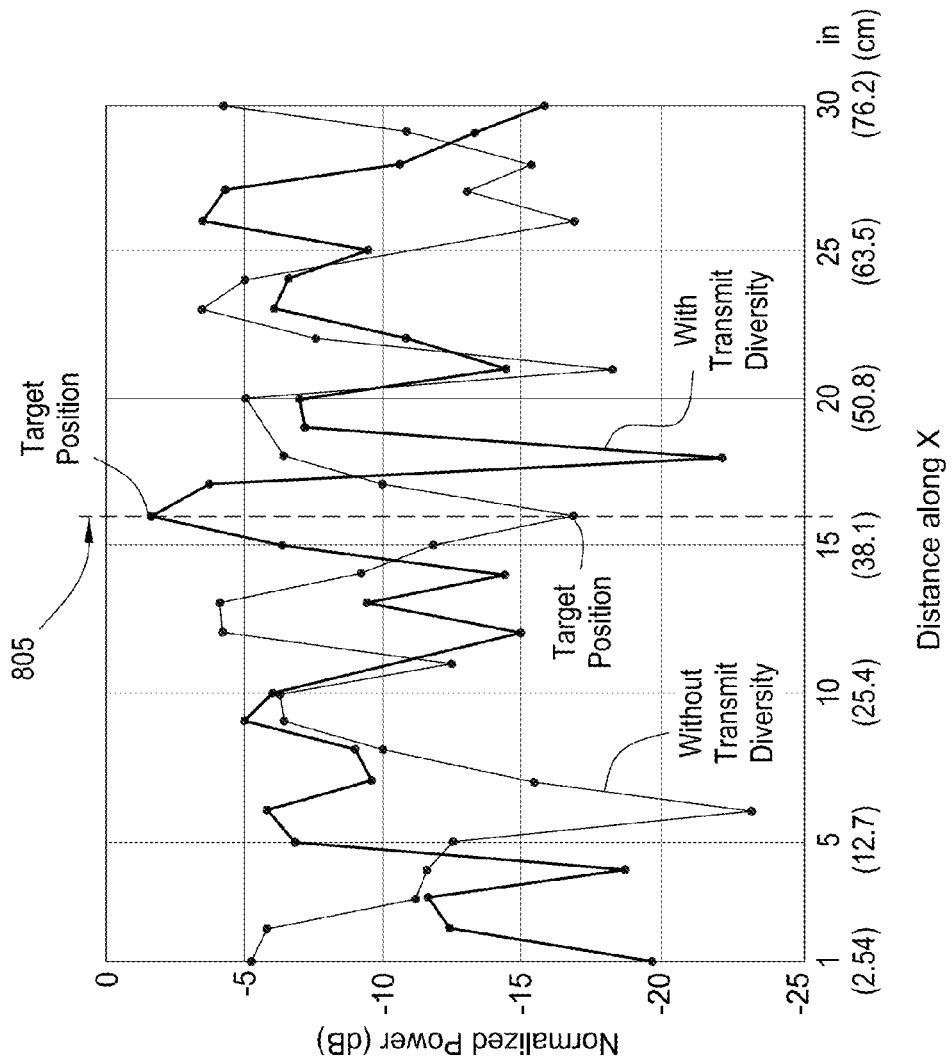

FIGS. 9A-B illustrate experimental results of using transmit diversity, according to embodiments of the invention. FIG. 9A illustrates a power distribution in front of the same tag reader used in FIG. 8 but with transmit diversity applied. The power was normalized to the maximum power measured in FIG. 8 for an equal comparison. As can be seen by comparing FIG. 8 with FIG. 9A, the power at the x-coordinate of the tag location 805 increases as the transmitted signals from the four antennas constructively interfere.

FIG. 9B illustrates the power (dB) normalized to the maximum measured in FIG. 8 with and without transmit diversity along the X direction with the Y direction set to 38.6 cm. An improvement of approximately 15 dB with transmit diversity is observed at the location of the RF tag 805.

Figure 10B:
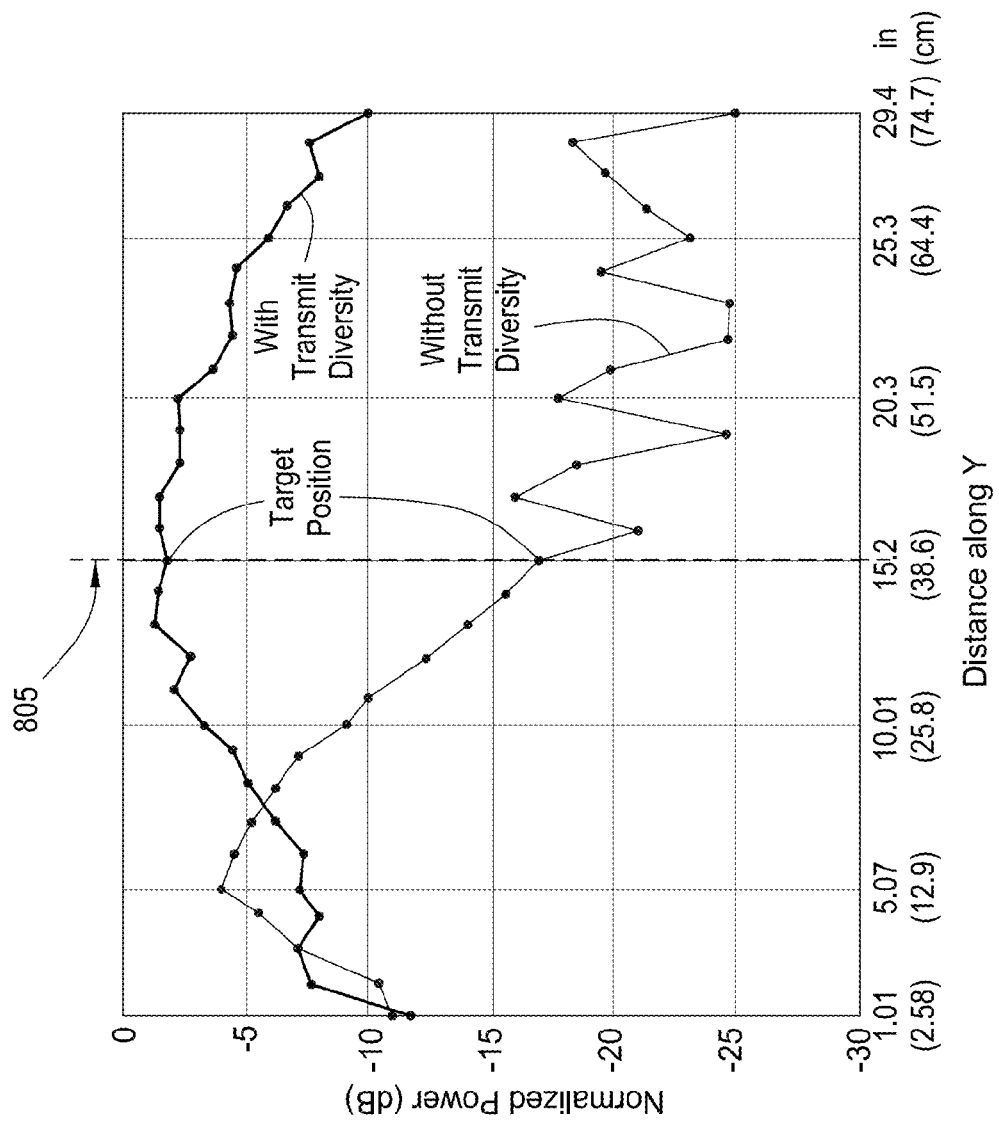

FIGS. 10A-B illustrate experimental results using transmit diversity, according to embodiments of the invention. FIG. 10A illustrates the normalized power with transmit diversity (i.e., FIG. 9A) minus the normalized power without transmit diversity in the decibel scale (i.e., FIG. 8). FIG. 10B illustrates the power (dB) normalized to the maximum measured in FIG. 8 with and without transmit diversity along the Y direction and with the X direction set to 40.6 cm. An improvement of approximately 15 dB is observed at the target location 805. The combination of FIGS. 9B and 10B show that transmit diversity increases the power delivered to the location 805 of the RF tag.

The flowchart and block diagrams in the Figures illustrate the architecture, functionality, and operation of possible implementations of systems, methods and computer program, products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of delivering power to an RF tag, comprising:
   transmitting a pilot signal from a first antenna, the first antenna selected from a plurality of antennas coupled to an RF tag reader;
   measuring a first phase of a modulated signal received from the RF tag, wherein the modulated signal is emitted by the RF tag in response to the pilot signal;
   determining a phase shift by identifying, based on the first phase of the modulated signal, a phase delay of a forward link in a backscatter channel corresponding to the first antenna of the plurality of antennas; and
   phase shifting a first signal transmitted by at least one of the plurality of antennas based on the phase shift, wherein the phase shift is selected to cause interference between the first signal and at least a second signal transmitted from a different antenna of the plurality of the antennas at a location of the RF tag.

2. The method of claim 1, wherein the RF tag is a passive or semi-passive RF tag and backscatters the modulated signal using only power delivered by the first signal or the second signal, and wherein the first and second signals constructively interfere at the location of the RF tag.

3. The method of claim 1, wherein determining the phase shift by identifying the phase delay of the forward link further comprises dividing the first phase by two to generate the phase delay of the forward link,
   wherein the first antenna and the at least one of the plurality of antennas are the same antenna,
   wherein the first signal is phase shifted by the phase delay of the forward link, and
   wherein the RF tag reader operates in a monostatic mode.

4. The method of claim 3, further comprising:
   transmitting the pilot signal from a second antenna selected from the plurality of antennas, wherein the first antenna is not transmitting the pilot signal;
   measuring a second phase of a modulated signal received from the RF tag in response to the pilot signal transmitted by the second antenna;
   determining a different phase shift from the second phase of the modulated signal;
   dividing the different phase shift by two to generate a half phase shift; and
   phase shifting a third signal transmitted by the second antenna based on the half phase shift.

5. A tag reader configured to communicate with an RF tag, comprising:
   an interface configured to couple to a plurality of antennas, wherein a first antenna selected from the plurality of antennas is configured to transmit a pilot signal,
   wherein the tag reader is configured to measure a first phase from a modulated signal received from the RF tag, the modulated signal is emitted in response to the pilot signal, and
   wherein the tag reader is configured to determine a phase shift by one of (i) identifying, based on the first phase, a phase delay of a forward link in a backscatter channel corresponding to the first antenna of the plurality of antennas and (ii) identifying, based on the first phase, a phase delay difference between forward links corresponding to the first antenna and to a second antenna of the plurality of antennas, respectively; and
   a phase shifting component configured to phase shift at least a first signal transmitted by at least one of the plurality of antennas based on the phase shift, wherein the phase shift is selected to cause interference between the first signal and at least a second signal transmitted from a different antenna of the plurality of the antennas at a location of the RF tag.

6. The tag reader of claim 5, wherein the RF tag is a passive or semi-passive RF tag and backscatters the modulated signal using only power delivered by the first signal or the second signal, and wherein the first and second signal constructively interfere at the location of the RF tag.

7. The tag reader of claim 5, wherein determining the phase shift based on the first phase of the modulated signal further comprises dividing the first phase by two to generate the phase delay of the forward link,
   wherein the first antenna and the at least one of the plurality of antennas are the same antenna,
   wherein the first signal is phase shifted by the phase delay of the forward link, and
   wherein the RF tag reader operates in a monostatic mode.

8. The tag reader of claim 7, wherein the pilot signal is transmitted from the second antenna selected from the plurality of antennas, wherein the first antenna is not transmitting the pilot signal,
   wherein a second phase of a modulated signal received from the RF tag in response to the pilot signal transmitted by the second antenna is measured,
   wherein a different phase shift, based on the second phase of the modulated signal, is determined,
   wherein the different phase shift is divided by two to generate a half phase shift, and
   wherein a third signal transmitted by the second antenna is phase shifted based on the half phase shift.

9. The tag reader of claim 5, wherein the pilot signal is transmitted from each of the plurality of antennas simultaneously and wherein the RF tag reader operates in a monostatic mode.

10. The tag reader of claim 9, wherein determining the phase shift based on the first phase of the modulated signal further comprises:
    receiving on the first antenna the modulated signal received from the RF tag in response to the pilot signals transmitted from the plurality of antennas, the modulated signal including the first phase;
    receiving on the second antenna of the plurality of antennas a different modulated signal received from the RF tag in response to the pilot signals transmitted from the plurality of antennas, the different modulated signal including a second phase; and
    determining the phase delay difference based on the first and second phases, wherein the phase shift shifts a third signal transmitted by one of the first antenna and the second antenna based on the phase delay difference.

11. The tag reader of claim 5, wherein the RF tag reader operates in a bistatic mode, and wherein the first antenna is a transmit antenna.

12. The tag reader of claim 11, wherein determining the phase shift from the first phase of the modulated signal further comprises:
    receiving on the second antenna of the plurality of antennas the modulated signal received from the RF tag in response to the pilot signal transmitted from the first antenna, the modulated signal including the first phase;
    transmitting the pilot signal from a third antenna selected from the plurality of antennas, wherein the first antenna is not transmitting the pilot signal;
    receiving on the second antenna a different modulated signal received from the RF tag in response to the pilot signal transmitted from the third antenna, the different modulated signal including a second phase; and determining the phase delay difference based on the first and second phases, wherein the phase shift shifts a third signal transmitted by one of the one of the first antenna and the third antenna based on the phase delay difference.

13. A system, comprising:
a passive or semi-passive RF tag; and
a tag reader configured to communicate with the RF tag, comprising:
   an interface configured to couple to a plurality of antennas, wherein a first antenna selected from the plurality of antennas is configured to transmit a pilot signal, wherein the tag reader is configured to measure a first phase from a modulated signal received from the RF tag, the modulated signal is emitted in response to the pilot signal, and wherein the tag reader is configured to determine a phase shift by one of (i) identifying, based on the first phase, a phase delay of a forward link in a backscatter channel corresponding to a first antenna of the plurality of antennas and (ii) identifying, based on the first phase, a phase delay difference between forward links corresponding to the first antenna and to a second antenna of the plurality of antennas, respectively; and
   a phase shifting component that phase shifts a first signal transmitted by at least one of the plurality of antennas based on the phase shift, wherein the phase shift is selected to cause interference between the first signal and at least a second signal transmitted from a different antenna of the plurality of the antennas at a location of the RF tag.

14. The system of claim 13, wherein determining the phase shift based on the phase of the modulated signal further comprises dividing the first phase by two to generate the phase delay of the forward link,
   wherein the first antenna and the at least one of the plurality of antennas are the same antenna,
   wherein the first signal is phase shifted by the phase delay of the forward link, and
   wherein the RF tag reader operates in a monostatic mode.

15. The system of claim 14, wherein the pilot signal is transmitted from the second antenna selected from the plurality of antennas, wherein the first antenna is not transmitting the pilot signal,
   wherein a second phase of a modulated signal received from the RF tag in response to the pilot signal transmitted by the second antenna is measured,
   wherein a different phase shift from the second phase of the modulated signal is determined,
   wherein the different phase shift is divided by two to generate a half phase shift, and
   wherein a third signal transmitted by the second antenna is phase shifted based on the half phase shift.

16. The system of claim 13, wherein the pilot signal is transmitted from each of the plurality of antennas simultaneously and wherein the RF tag reader operates in a monostatic mode.

17. The system of claim 16, wherein determining the phase shift based on the first phase of the modulated signal further comprises:
   receiving on the first antenna the modulated signal received from the RF tag in response to the pilot signals transmitted from the plurality of antennas, the modulated signal including the first phase;
   receiving on the second antenna of the plurality of antennas a different modulated signal received from the RF tag in response to the pilot signals transmitted from the plurality of antennas, the different modulated signal including a second phase; and
   determining the phase delay difference based on the first and second phases, wherein the phase shift shifts a third signal transmitted by one of the first antenna and the second antenna based on the phase delay difference.

18. The system of claim 13, wherein the RF tag reader operates in a bistatic mode, and wherein the first antenna is a transmit antenna.

19. The system of claim 18, wherein determining the phase shift from the first phase of the modulated signal further comprises:
   receiving on the second antenna of the plurality of antennas the modulated signal received from the RF tag in response to the pilot signal transmitted from the first antenna, the modulated signal including the first phase;
   transmitting the pilot signal from a third antenna selected from the plurality of antennas, wherein the first antenna is not transmitting the pilot signal;
   receiving on the second antenna a different modulated signal received from the RF tag in response to the pilot signal transmitted from the third antenna, the different modulated signal including a second phase; and
   determining the phase delay difference based on the first and second phases, wherein the phase shift shifts a third signal transmitted by one of the one of the first antenna and the third antenna based on the phase delay difference.

20. The system of claim 13, wherein the first and second signal constructively interfere at the location of the RF tag.

21. A method of delivering power to an RF tag, comprising:
   transmitting a pilot signal from a first antenna, the first antenna selected from a plurality of antennas coupled to an RF tag reader;
   measuring a first phase of a modulated signal received from the RF tag, wherein the modulated signal is emitted by the RF tag in response to the pilot signal;
   determining a phase shift by identifying, based on the first phase, a phase delay difference between forward links corresponding to the first antenna and to a second antenna of the plurality of antennas, respectively; and
   phase shifting a first signal transmitted by at least one of the plurality of antennas based on the phase shift, wherein the phase shift is selected to cause interference between the first signal and at least a second signal transmitted from a different antenna of the plurality of the antennas at a location of the RF tag.

22. The method of claim 21, wherein the pilot signal is transmitted from each of the plurality of antennas simultaneously and wherein the RF tag reader operates in a monostatic mode.

23. The method of claim 22, wherein determining the phase shift from the first phase of the modulated signal further comprises:
   receiving on the first antenna the modulated signal received from the RF tag in response to the pilot signals transmitted from the plurality of antennas, the modulated signal including the first phase;
   receiving on the second antenna of the plurality of antennas a different modulated signal received from the RF tag in response to the pilot signals transmitted from the plurality of antennas, the different modulated signal including a second phase;

determining the phase delay difference based on the first and second phases, wherein the phase shift shifts a third signal transmitted by one of the first antenna and the second antenna based on the phase delay difference.

24. The method of claim 21, wherein the RF tag reader operates in a bistatic mode, and wherein the first antenna is a transmit antenna.

25. The method of claim 24, wherein determining the phase shift from the first phase of the modulated signal further comprises:
   receiving on the second antenna of the plurality of antennas the modulated signal received from the RF tag in response to the pilot signal transmitted from the first antenna, the modulated signal including the first phase;
   transmitting the pilot signal from a third antenna selected from the plurality of antennas, wherein the first antenna is not transmitting the pilot signal;
   receiving on the second antenna a different modulated signal received from the RF tag in response to the pilot signal transmitted from the third antenna, the different modulated signal including a second phase;
   determining the phase delay difference based on the first and second phases, wherein the phase shift shifts a third signal transmitted by one of the one of the first antenna and the third antenna based on the phase delay difference.

* * * * *

UNITED STATES PATENT AND TRADEMARK OFFICE
CERTIFICATE OF CORRECTION

PATENT NO. : 8,922,350 B2
APPLICATION NO. : 13/314905
DATED : December 30, 2014
INVENTOR(S) : Griffin et al.

It is certified that error appears in the above-identified patent and that said Letters Patent is hereby corrected as shown below:

In the Specification:

Column 10, Line 23, please delete $$\tilde{\vec{y}}(\vec{r},t) = 1;2\tilde{H}^b(\vec{r})\tilde{S}(t)\tilde{H}^f(\vec{r})\tilde{\vec{x}}(t)$$

and insert -- $\tilde{\vec{y}}(\vec{r},t) = \frac{1}{2}\tilde{H}^b(\vec{r})\tilde{S}(t)\tilde{H}^f(\vec{r})\tilde{\vec{x}}(t)$ -- therefor;

Column 10, Line 31, please delete "()" and insert -- (~) -- therefor;

Column 11, Line 25, please delete $$\tilde{\vec{y}}(\vec{r})\tilde{\Gamma}(t)\tilde{h}^f(\vec{r})\tilde{x}$$

and insert -- $\tilde{y}(\vec{r}) = \tilde{h}^b(\vec{r})\tilde{\Gamma}(t)\tilde{h}^f(\vec{r})\tilde{x}$ -- therefor;

Column 12, Line 40, please delete "2πradians" and insert -- 2π radians -- therefor;

Column 12, Line 41, please delete " $\hat{\bar{\theta}}$ " and insert -- $\bar{\theta}$ -- therefor;

Column 13, Line 37, please delete "on'only" and insert -- on only -- therefor;

Signed and Sealed this
Thirty-first Day of March, 2015

Michelle K. Lee
*Director of the United States Patent and Trademark Office*

CERTIFICATE OF CORRECTION (continued)
U.S. Pat. No. 8,922,350 B2

Column 13, Lines 66-67, please delete $$\Delta = \angle \tilde{h}_{160e}{}^b + \angle(\angle \tilde{h}_{160c}{}^f + \angle \tilde{h}_{160d}{}^f + \angle \tilde{h}_{160e}{}^f) - \angle \tilde{h}_{160d}{}^b + \angle(\angle \tilde{h}_{160c}{}^f + \angle \tilde{h}_{160d}{}^f + \angle \tilde{h}_{160e}{}^f))$$

and insert $$\Delta = \angle \tilde{h}^b_{160e} + \angle(\tilde{h}^f_{160c} + \tilde{h}^f_{160d} + \tilde{h}^f_{160e}) - (\angle \tilde{h}^b_{160d} + \angle(\tilde{h}^f_{160c} + \tilde{h}^f_{160d} + \tilde{h}^f_{160e}))$$

-- therefor;

Column 14, Line 2, please delete $$\angle(\angle \tilde{h}_{160c}{}^f + \angle \tilde{h}_{160d}{}^f + \angle \tilde{h}_{160e}{}^f)$$

and insert -- $\angle(\tilde{h}^f_{160c} + \tilde{h}^f_{160d} + \tilde{h}^f_{160e})$ -- therefor;

Column 14, Line 6, please delete $$\Delta = \angle \tilde{h}_{160e}{}^f - \angle \tilde{h}_{160d}{}^f$$

and insert -- $\Delta = \angle \tilde{h}^f_{160e} - \angle \tilde{h}^f_{160d}$ -- therefor;

Column 14, Line 10-11, please delete $$160_e \; \angle \tilde{h}_{160e}{}^f)$$

and insert -- $160_e \; (\angle \tilde{h}^f_{160e})$ -- therefor;

Column 14, Line 11, please delete $$160_d \; (\angle \tilde{h}_{160d}{}^f)$$

CERTIFICATE OF CORRECTION (continued)
U.S. Pat. No. 8,922,350 B2 and insert -- $160_d\ (\angle \tilde{h}^f_{160d})$ -- therefor;

Column 14, Line 34, please delete "composite' phase" and insert -- composite phase -- therefor;

Column 14, Lines 40-41, please delete

" $\angle(\tilde{h}_{160c}{}^f + \tilde{h}_{160d} + \tilde{h}_{160e})$ "

and insert -- $\angle(\tilde{h}^f_{160c} + \tilde{h}^f_{160d} + \tilde{h}^f_{160e})$ -- therefor;

Column 15, Lines 40, please delete

" $\Delta = (\angle \tilde{h}_{160g} + \angle \tilde{h}_{160h}) - (\angle \tilde{h}_{160f} + \angle \tilde{h}_{160h})$ "

and insert -- $\Delta = (\angle \tilde{h}^f_{160g} + \angle \tilde{h}^b_{160h}) - (\angle \tilde{h}^f_{160f} + \angle \tilde{h}^b_{160h})$ -- therefor;

Column 15, Lines 45, please delete " $\Delta = \angle \tilde{h}_{160g}{}^f - \angle \tilde{h}_{160f}{}^f$ "

and insert -- $\Delta = \angle \tilde{h}^f_{160g} - \angle \tilde{h}^f_{160f}$ -- therefor;

In Claims:

Column 22, Claim 18, Line 11, please delete "first".